United States Patent
Goodchild et al.

(10) Patent No.: US 12,126,185 B2
(45) Date of Patent: Oct. 22, 2024

(54) DIGITAL PING SELECTION IN A MULTI-COIL WIRELESS CHARGING DEVICE

(71) Applicant: AIRA, INC., Chandler, AZ (US)

(72) Inventors: Eric Heindel Goodchild, Phoenix, AZ (US); David Russell, Scottsdale, AZ (US)

(73) Assignee: Aira, Inc., Phoenix, AZ (US)

( * ) Notice: Subject to any disclaimer, the term of this patent is extended or adjusted under 35 U.S.C. 154(b) by 311 days.

(21) Appl. No.: 17/400,053

(22) Filed: Aug. 11, 2021

(65) Prior Publication Data

US 2022/0052556 A1    Feb. 17, 2022

Related U.S. Application Data

(60) Provisional application No. 63/066,313, filed on Aug. 16, 2020.

(51) Int. Cl.
*H02J 50/80* (2016.01)
*H02J 50/12* (2016.01)

(52) U.S. Cl.
CPC .............. *H02J 50/12* (2016.02); *H02J 50/80* (2016.02)

(58) Field of Classification Search
CPC .. H02J 50/12; H02J 50/80; H02J 50/60; H02J 50/90; H02J 50/40; H02J 7/0013; H02J 50/10; H02J 7/00304; H02J 7/00308; H02J 50/50; H02J 50/402; H02J 7/0042; H02J 50/70; H02J 7/00; H02J 7/00302; H02J 50/005; H02J 50/502; H02J 7/00036; H02J 7/00047; H02J 7/00714; H02J 7/0044; H02J 7/0047; H02J 7/02; H02J 2310/22; H02J 2310/40; H02J 50/20; H02J 50/15; H02J 7/00032; H02J 7/00034; H02J 7/00309; H02J 7/04; H02J 50/23; H02J 7/007184;
(Continued)

(56) References Cited

U.S. PATENT DOCUMENTS 7,952,322 B2    5/2011  Partovi et al.
2014/0176055 A1 6/2014  Van Lammeren et al.
(Continued)

OTHER PUBLICATIONS

PCT/US2021/045812. International Search Report and Written Opinion mailed Nov. 16, 2021. (8 pages).

*Primary Examiner* — Binh C Tat
(74) *Attorney, Agent, or Firm* — LOZA & LOZA LLP; Anthony Smyth

(57) ABSTRACT

Systems, methods and apparatus for wireless charging are disclosed. A charging device has a plurality of charging cells provided on a charging surface, a charging circuit and a controller. The controller may be configured to cause the charging circuit to send pings from a plurality of charging coils using an analog ping process to scan for one or more ping responses from a receiving device in proximity to the charging surface. A subset of charging coils of the plurality of charging coils that received ping responses from the receiving device in response to the sending of pings with the analog process may be determined. Subsequently, the controller then sends pings from the subset of charging coils using a digital ping process. A combination of one or more charging coils of the subset of charging coils may then be selected based on ping responses from the receiving device.

8 Claims, 23 Drawing Sheets

(58) Field of Classification Search
CPC ............... H02J 7/00718; H02J 2310/48; H02J 7/00712; H02J 7/0045; H02J 7/007192; H02J 7/007194; H02J 7/0029; H02J 7/00041; H02J 2207/20; H02J 7/00045; H02J 7/0024; H02J 7/0048; H02J 7/007; H02J 7/00711; H02J 7/007182; H02J 7/007188; H02J 7/0019; H02J 7/342; H04B 5/0093; H04B 5/0081; H04B 5/0037; H04B 5/0087; H04B 5/266; H04B 5/26; H04B 1/04; H04B 5/00; H01F 27/361; H01F 5/003; H01F 27/2823
USPC .................................................. 320/106–115
See application file for complete search history.

(56) References Cited

U.S. PATENT DOCUMENTS

| | | | |
|---|---|---|---|
| 2016/0134154 A1 | 5/2016 | Baarman et al. | |
| 2016/0268842 A1* | 9/2016 | Wang ..................... | H02J 9/005 |
| 2018/0323634 A1* | 11/2018 | Lee .......................... | H02J 50/90 |
| 2019/0123581 A1* | 4/2019 | Wang ..................... | H02J 50/10 |
| 2019/0267828 A1 | 8/2019 | Goodchild et al. | |

\* cited by examiner

Unloaded LC Response

Response Affected by Non-Ferrous Object

Response Affected by Proximate Receiver

DIGITAL PING SELECTION IN A MULTI-COIL WIRELESS CHARGING DEVICE

PRIORITY CLAIM

This application claims priority to and the benefit of provisional patent application No. 63/066,313 filed in the United States Patent Office on Aug. 16, 2020, and the entire content of this application is incorporated herein by reference as if fully set forth below in their entirety and for all applicable purposes.

TECHNICAL FIELD

The present invention relates generally to wireless charging of batteries, including batteries in mobile computing devices, and more particularly to digital ping selection by a wireless charging device to obtain charging coil selection for the wireless charging device.

BACKGROUND

Wireless charging systems have been deployed to enable certain types of devices to charge internal batteries without the use of a physical charging connection. Devices that can take advantage of wireless charging include mobile processing and/or communication devices. Standards, such as the Qi standard defined by the Wireless Power Consortium enable devices manufactured by a first supplier to be wirelessly charged using a charger manufactured by a second supplier. Standards for wireless charging are optimized for relatively simple configurations of devices and tend to provide basic charging capabilities.

Conventional wireless charging systems typically use a "Ping" to determine if a receiving device is present on or proximate to a transmitting coil in a base station for wireless charging. The transmitter coil has an inductance (L) and a resonant capacitor that has a capacitance (C) that is coupled to the transmitting coil to obtain a resonant LC circuit. A Ping is produced by delivering power to the resonant LC circuit. Power is applied for a duration of time while the transmitter listens for a response from a receiving device. Additionally, in multi-coil wireless charging devices, the ping may be used to determine an optimal combination of coils to use for charging a battery in the receiving device.

Improvements in wireless charging capabilities are required to support continually increasing complexity of mobile devices and changing form factors. For example, there is a need for quicker determination of an optimal combination of coils to use for charging a receiving device by the wireless charging device.

DETAILED DESCRIPTION

Figure 1:
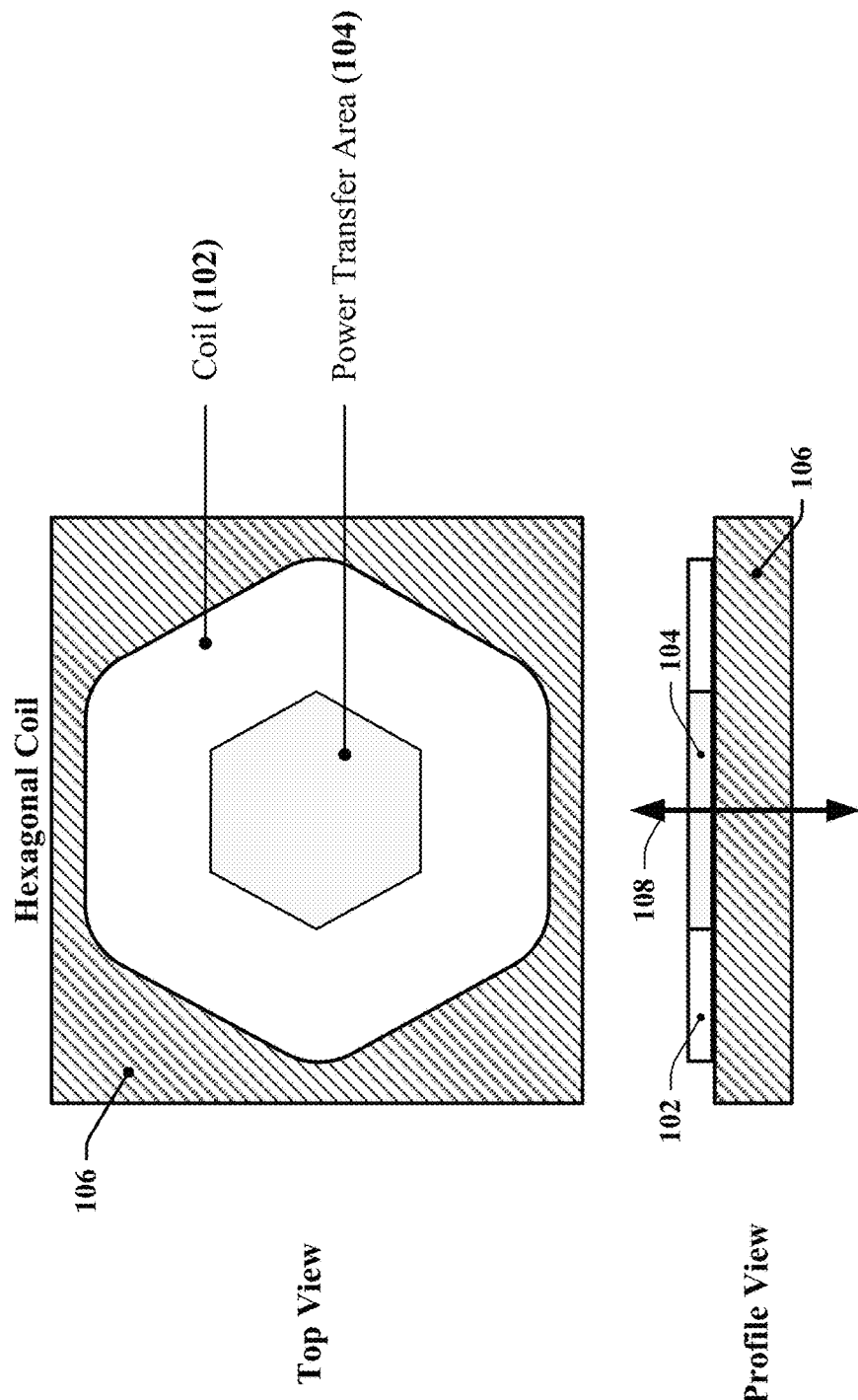
FIG. 1 illustrates an example of a charging cell that may be provided on a charging surface provided by a wireless charging device in accordance with certain aspects disclosed herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of wireless charging systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a processor-readable storage medium. A processor-readable storage medium, which may also be referred to herein as a computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), Near Field Communications (NFC) token, random access memory (RAM), read only memory (ROM), programmable ROM (PROM), erasable PROM (EPROM), electrically erasable PROM (EEPROM), a register, a removable disk, a carrier wave, a transmission line, and any other suitable medium for storing or transmitting software. The computer-readable medium may be resident in the processing system, external to the processing system, or distributed across multiple entities including the processing system. Computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

Overview

Certain aspects of the present disclosure relate to systems, apparatus and methods applicable to wireless charging devices and techniques. Charging cells may be configured with one or more inductive coils to provide a charging surface in a charging device where the charging surface enables the charging device to charge one or more chargeable devices wirelessly. The location of a device to be charged may be detected through sensing techniques that associate location of the device to changes in a physical characteristic centered at a known location on the charging surface. Sensing of location may be implemented using capacitive, resistive, inductive, touch, pressure, load, strain, and/or another appropriate type of sensing.

In one aspect of the disclosure, an apparatus has a battery charging power source, a plurality of charging cells configured in a matrix, a first plurality of switches in which each switch is configured to couple a row of coils in the matrix to a first terminal of the battery charging power source, and a second plurality of switches in which each switch is configured to couple a column of coils in the matrix to a second terminal of the battery charging power source. Each charging cell in the plurality of charging cells may include one or more coils surrounding a power transfer area. The plurality of charging cells may be arranged adjacent to the charging surface of the charging device without overlap of power transfer areas of the charging cells in the plurality of charging cells.

In some instances, the apparatus may also be referred to as a charging surface. Power can be wirelessly transferred to a receiving device located anywhere on a surface of the apparatus. The devices can have an arbitrarily defined size and/or shape and may be placed without regard to any discrete placement locations enabled for charging. Multiple devices can be simultaneously charged on a single charging surface. The apparatus can track motion of one or more devices across the charging surface.

Charging Cells

According to certain aspects disclosed herein, a charging surface may be provided using charging cells in a charging device, where the charging cells are deployed adjacent to the charging surface. In one example the charging cells are deployed in one or more layers of the charging surface in accordance with a honeycomb packaging configuration. A charging cell may be implemented using one or more coils that can each induce a magnetic field along an axis that is substantially orthogonal to the charging surface adjacent to the coil. In this description, a charging cell may refer to an element having one or more coils where each coil is configured to produce an electromagnetic field that is additive with respect to the fields produced by other coils in the charging cell and directed along or proximate to a common axis. In some examples, the coils in a charging cell are formed using traces on a printed circuit board. In some examples, a coil in a charging cell is formed by spirally winding a wire to obtain a planar coil or a coil that has a generally cylindrical outline. In one example, Litz wire may be used to form a planar or substantially flat winding that provides a coil with a central power transfer area.

In some implementations, a charging cell includes coils that are stacked along a common axis and/or that overlap such that they contribute to an induced magnetic field substantially orthogonal to the charging surface. In some implementations, a charging cell includes coils that are arranged within a defined portion of the charging surface and that contribute to an induced magnetic field within the substantially orthogonal portion of the charging surface associated with the charging cell. In some implementations, charging cells may be configurable by providing an activating current to coils that are included in a dynamically-defined charging cell. For example, a charging device may include multiple stacks of coils deployed across the charging surface, and the charging device may detect the location of a device to be charged and may select some combination of stacks of coils to provide a charging cell adjacent to the device to be charged. In some instances, a charging cell may include, or be characterized as a single coil. However, it should be appreciated that a charging cell may include multiple stacked coils and/or multiple adjacent coils or stacks of coils. The coils may be referred to herein as charging coils, wireless charging coils, transmitter coils, transmitting coils, power transmitting coils, power transmitter coils, or the like.

FIG. 1 illustrates an example of a charging cell 100 that may be deployed and/or configured to provide a charging surface of a charging device. As described herein, the charging surface may include an array of charging cells 100 provided on one or more substrates 106. A circuit comprising one or more integrated circuits (ICs) and/or discrete electronic components may be provided on one or more of the substrates 106. The circuit may include drivers and switches used to control currents provided to coils used to transmit power to a receiving device. The circuit may be configured as a processing circuit that includes one or more processors and/or one or more controllers that can be configured to perform certain functions disclosed herein. In some instances, some or all of the processing circuit may be provided external to the charging device. In some instances, a power supply may be coupled to the charging device.

The charging cell 100 may be provided in close proximity to an outer surface area of the charging device, upon which one or more devices can be placed for charging. The charging device may include multiple instances of the charging cell 100. In one example, the charging cell 100 has a substantially hexagonal shape that encloses one or more coils 102, which may be constructed using conductors, wires or circuit board traces that can receive a current sufficient to produce an electromagnetic field in a power transfer area 104. In various implementations, some coils 102 may have a shape that is substantially polygonal, including the hexagonal charging cell 100 illustrated in FIG. 1. Other implementations provide coils 102 that have other shapes. The shape of the coils 102 may be determined at least in part by the capabilities or limitations of fabrication technology, and/or to optimize layout of the charging cells on a substrate 106 such as a printed circuit board substrate. Each coil 102 may be implemented using wires, printed circuit board traces and/or other connectors in a spiral configuration. Each charging cell 100 may span two or more layers separated by an insulator or substrate 106 such that coils 102 in different layers are centered around a common axis 108.

Figure 2:
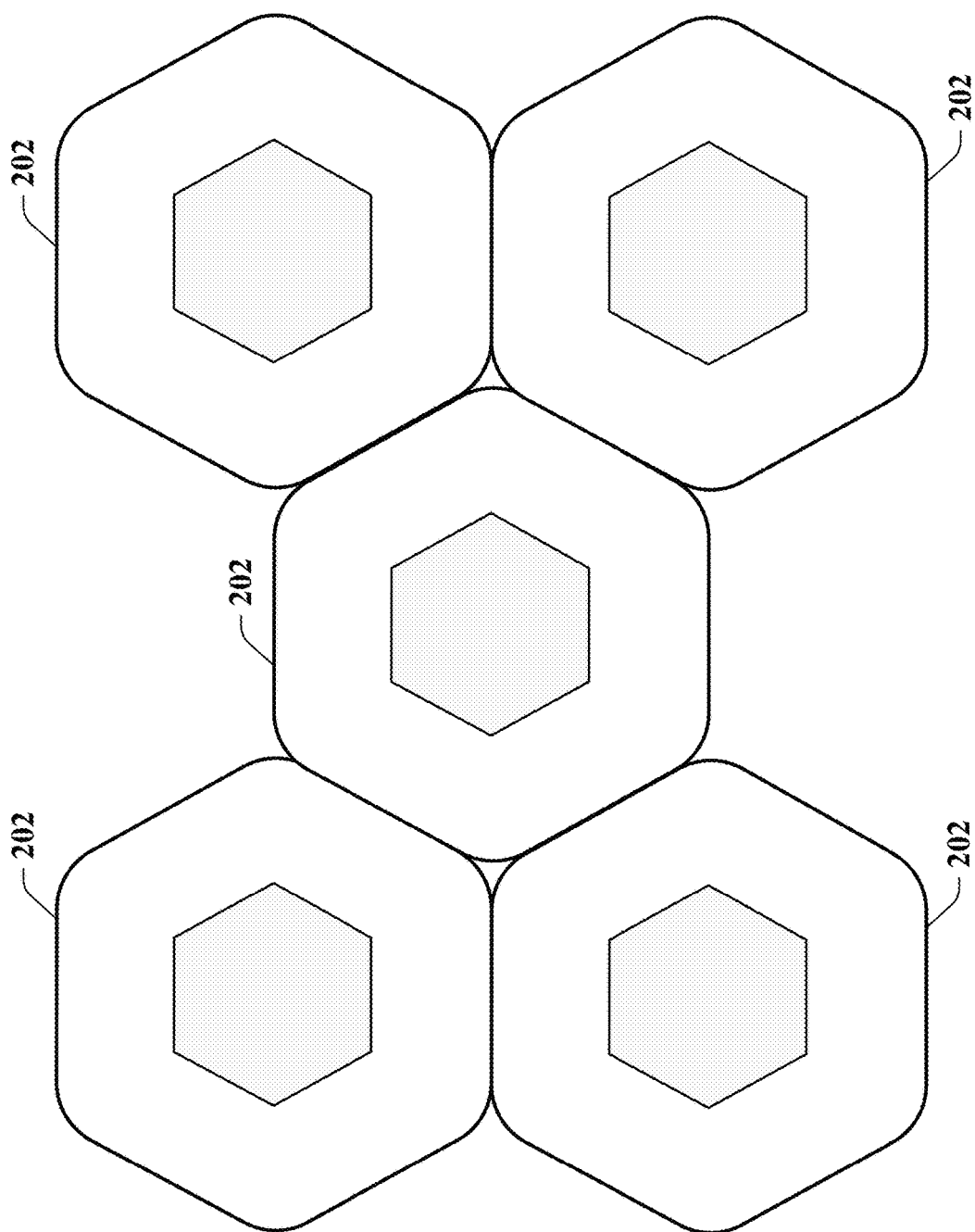
FIG. 2 illustrates an example of an arrangement of charging cells provided on a single layer of a segment of a charging surface provided by a wireless charging device in accordance with certain aspects disclosed herein.

FIG. 2 illustrates an example of an arrangement 200 of charging cells 202 provided on a single layer of a segment of a charging surface of a charging device that may be adapted in accordance with certain aspects disclosed herein. The charging cells 202 are arranged according to a honeycomb packaging configuration. In this example, the charging cells 202 are arranged end-to-end without overlap. This arrangement can be provided without through-hole or wire interconnects. Other arrangements are possible, including arrangements in which some portion of the charging cells 202 overlap. For example, wires of two or more coils may be interleaved to some extent.

Figure 3:
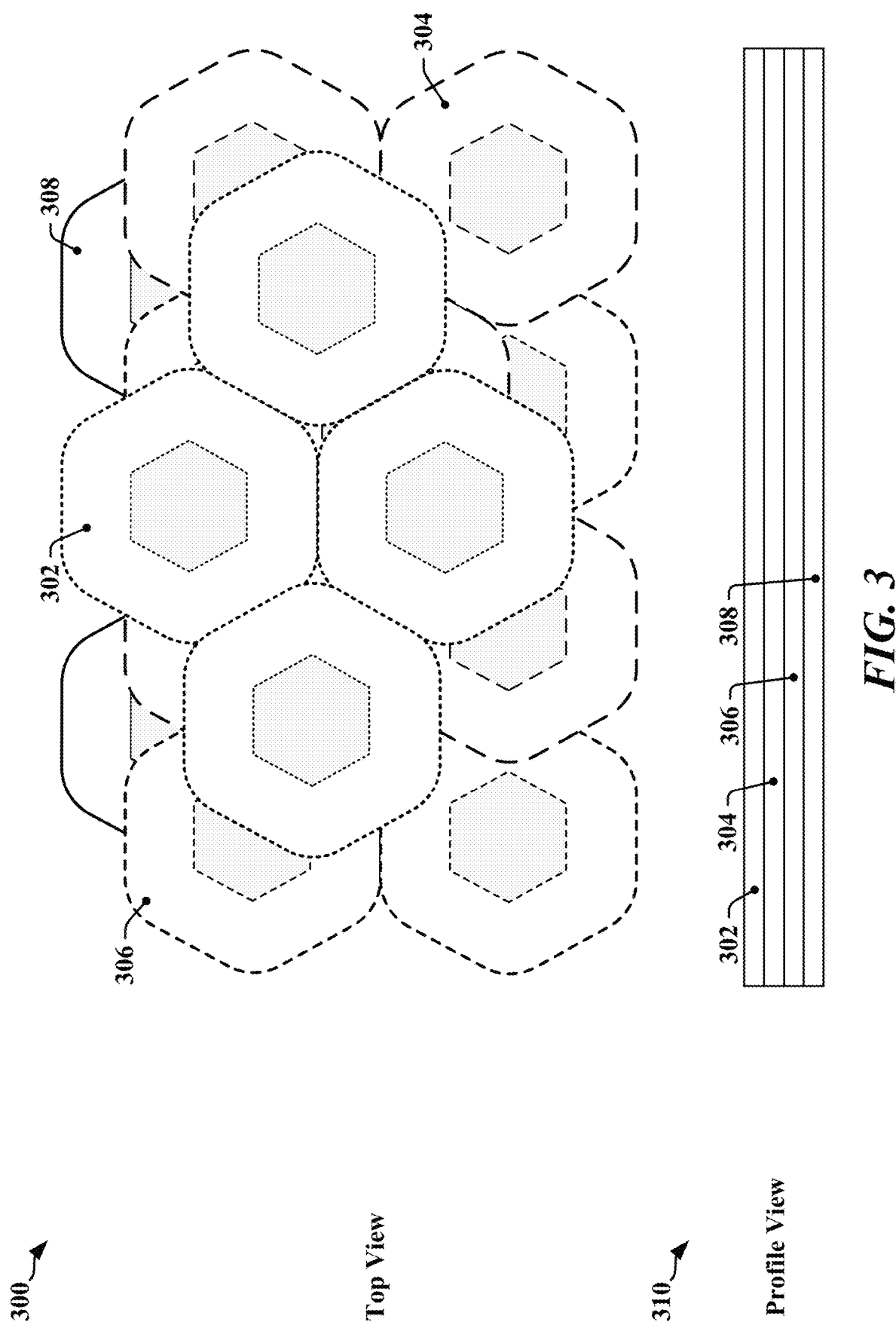
FIG. 3 illustrates an example of an arrangement of charging cells when multiple layers of charging cells are overlaid within a segment of a charging surface provided by a wireless charging device in accordance with certain aspects disclosed herein.

FIG. 3 illustrates an example of an arrangement of charging cells from two perspectives 300, 310 (e.g., top and profile views) when multiple layers are overlaid within a segment of a charging surface that may be adapted in accordance with certain aspects disclosed herein. Layers of charging cells 302, 304, 306, 308 are provided within a segment of a charging surface. The charging cells within each layer of charging cells 302, 304, 306, 308 are arranged according to a honeycomb packaging configuration. In one example, the layers of charging cells 302, 304, 306, 308 may be formed on a printed circuit board that has four or more layers. The arrangement of charging cells 100 can be selected to provide complete coverage of a designated charging area that is adjacent to the illustrated segment. The charging cells may be 302, 304, 306, 308 illustrated in FIG. 3 correspond to power transfer areas provided by transmitting coils that are polygonal in shape. In other implementations, the charging coils may comprise spirally wound planar coils constructed from wires, each being wound to provide a substantially circular power transfer area. In the latter examples, multiple spirally wound planar coils may be deployed in stacked planes below the charging surface of a wireless charging device.

Figure 4:
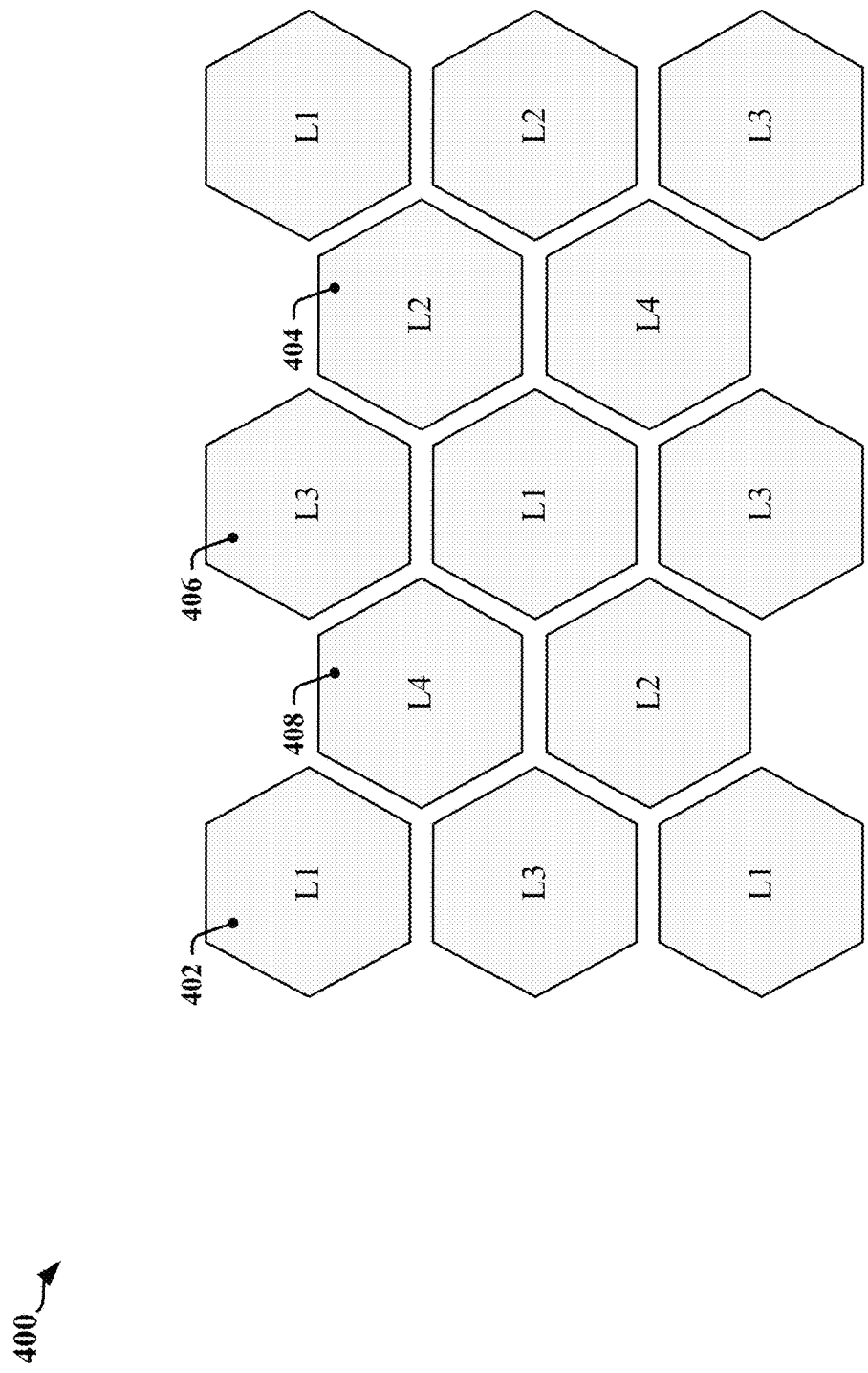
FIG. 4 illustrates the arrangement of power transfer areas provided by a charging surface of a charging device that employs multiple layers of charging cells configured in accordance with certain aspects disclosed herein.

FIG. 4 illustrates the arrangement of power transfer areas provided in a charging surface 400 that employs multiple layers of charging cells configured in accordance with certain aspects disclosed herein. The illustrated charging surface is constructed from four layers of charging cells 402, 404, 406, 408, which may correspond to the layers of charging cells 302, 304, 306, 308 in FIG. 3. In FIG. 4, each power transfer area provided by a charging cell in the first layer of charging cells 402 is marked "L1", each power transfer area provided by a charging cell in the second layer of charging cells 404 is marked "L2", each power transfer area provided by a charging cell in the third layer of charging cells 406 is marked "L3", and each power transfer area provided by a charging cell in the fourth layer of charging cells 408 is marked "L4".

Locating Devices on a Charging Surface

In accordance with certain aspects disclosed herein, location sensing may rely on changes in some property of the electrical conductors that form coils in a charging cell. Measurable differences in properties of the electrical conductors may include capacitance, resistance, inductance and/or temperature. In some examples, loading of the charging surface can affect the measurable resistance of a coil located near the point of loading. In some implementations, sensors may be provided to enable location sensing through detection of changes in touch, pressure, load and/or strain.

Figure 5:
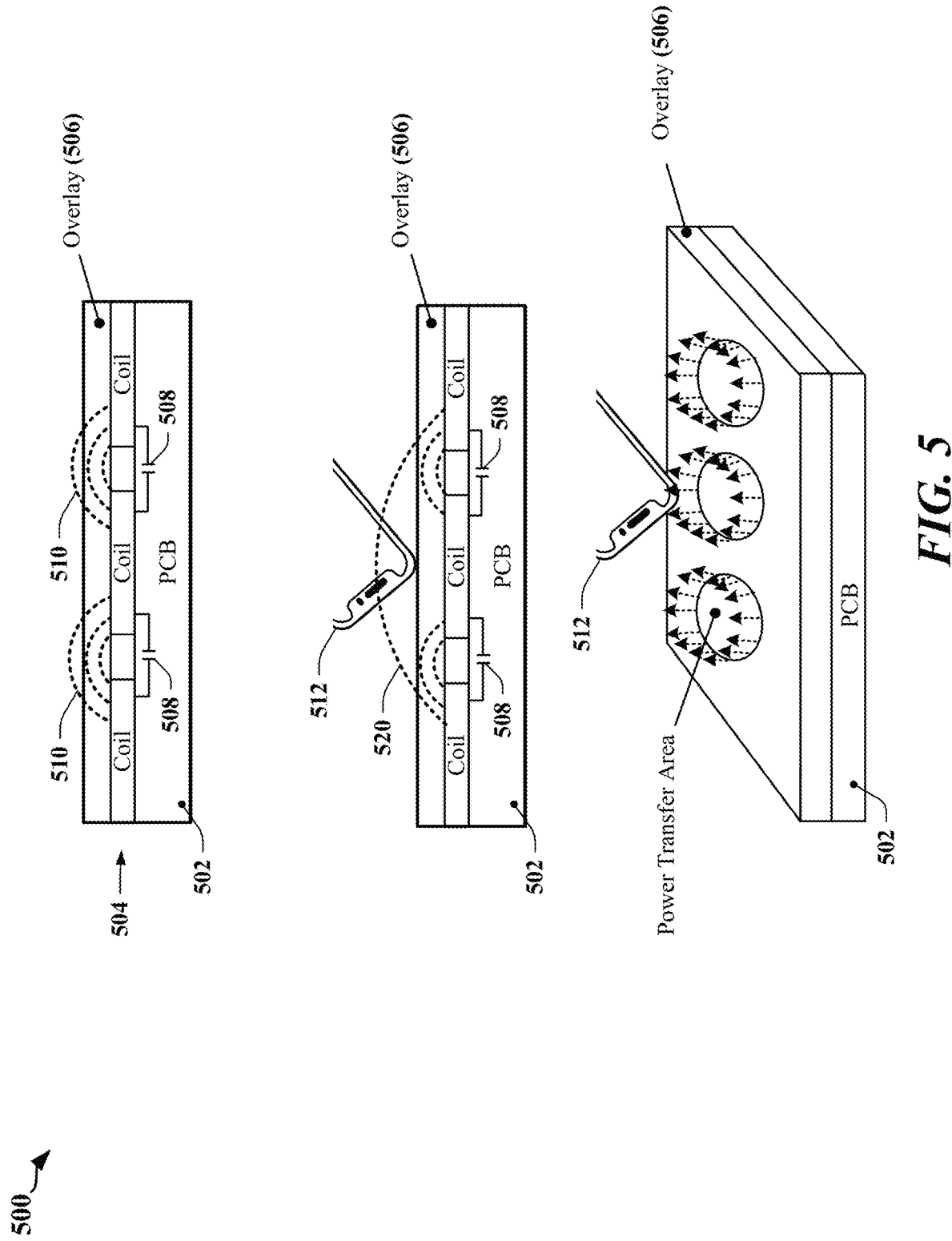
FIG. 5 illustrates the use of differential capacitive sensing to detect location and/or orientation of a mobile communication device in accordance with certain aspects disclosed herein.

Certain aspects disclosed herein provide apparatus and methods that can sense the location of low-power devices that may be freely placed on a charging surface using differential capacitive sense techniques. FIG. 5 illustrates an example 500 of the use of differential capacitive sense to detect location and/or orientation of a mobile communication device or other object 512. One or more coils 504 are provided on a surface of a printed circuit board 502, substrate or other type of carrier. Capacitive coupling (illustrated by the dashed lines 510) can be attributed to an effective capacitance 508 measurable between pairs of the coils 504. Capacitance may be measured using a circuit coupled to each of the coils 504. An object 512, such as a chargeable device can increase or decrease the apparent capacitance 508 between the pairs of the coils 504. The object 512 may modify the capacitive coupling (illustrated by the dashed lines 520) between the pairs of the coils 504. In one example, the object 512 may affect the dielectric properties of an overlay 506, provide an alternative capacitive circuit through the object 512, or produce some other change in electrical characteristics that increases or decreases the measured or apparent value of the capacitance 508 between the pairs of the coils 504. The measured difference caused by the object 512 may be referred to as differential capacitance.

A charging device can use differential capacitive sensing to locate devices anywhere on a charging surface that includes a coil array provided according to certain aspects disclosed herein. The charging device may then determine one or more of the coils 504 that can be used to provide optimal charging of the device, which may be referred to as a receiving device.

The use of differential capacitive sensing enables an extremely low-power detection and location operation in comparison to conventional detection techniques. Conventional techniques used in current wireless charging applications for detecting devices employ "ping" methods that drive the transmitting coil and consume substantial power (e.g., 100-200 mW). The field generated by the transmitting coil is used to detect a receiving device. Differential capacitive sensing does not require powering the transmitting coil to detect presence of a receiving device and requires no additional sensing elements. The coils used in the coil array can serve as the capacitive sense elements used to find a receiving device and/or to identify physical location of the receiving device.

Differential capacitive sensing operates by measuring the differential capacitance between two adjacent coils. Differences and/or changes in capacitance can identify presence of the receiving device, without the need for a ground plane or additional conductive sense elements. Differential capacitive sensing provides a high-speed methodology that enables rapid detection of receiving devices by eliminating the need to wait for a response transmitted by a receiving device in response to a ping. Differential capacitive sensing can also sense receiving devices that have insufficient stored power to respond to a ping or query from the charging device.

According to certain aspects, presence, position and/or orientation of a receiving device may be determined using differential capacitive sensing or another location sensing technique that involves, for example, detecting differences or changes in capacitance, resistance, inductance, touch, pressure, temperature, load, strain, and/or another appropriate type of sensing. Location sensing may be employed to determine an approximate location of the device to be charged and enable a charging device to determine if a compatible device has been placed on the charging surface. For example, the charging device may determine that a compatible device has been placed on the charging surface by sending an intermittent test signal (ping) that causes a compatible device to respond. The charging device may be configured to activate one or more coils in at least one charging cell after determining receipt of a response signal defined by standard, convention, manufacturer or application. In some examples, the compatible device can respond to a ping by communicating received signal strength such that the charging device can find an optimal charging cell to be used for charging the compatible device.

In one example, a controller, state machine or other processing device may be configured to measure a capacitance attributable to one or more coils in a charging cell, and to determine whether the measured capacitance indicates proximity of a receiving device or corresponding coil in a receiving device. In some instances, the capacitance may be measured as a difference in capacitance in a sensing circuit. The controller, state machine or other processing device may maintain information that identifies expected capacitance associated with each charging cell when no receiving device is present. Differences in measured capacitance may then be used to determine that a receiving device is located near the charging cell. The size of the difference may be indicative of the distance between charging cell and the receiving device.

In some implementations, the controller, state machine or other processing device may maintain one or more profiles of the charging surface. The profiles may relate individual or groups of charging cells to expected capacitance measurements, last measured capacitances and/or historical likelihoods of capacitance values when a receiving device is present.

According to certain aspects, presence, position and/or orientation of a receiving device may be determined by searching the charging cells for differences in capacitance using a search pattern. The search pattern may be pseudo-random to improve average time to detect a charging device. In some implementations, the starting point of the search may be selected based on a history of measurements captured when a receiving device was in proximity and receiving charge. In some implementations, an initial group of charging cells may be prioritized for searching based on a history of measurements captured when a receiving device was in proximity and receiving charge.

Figure 6:
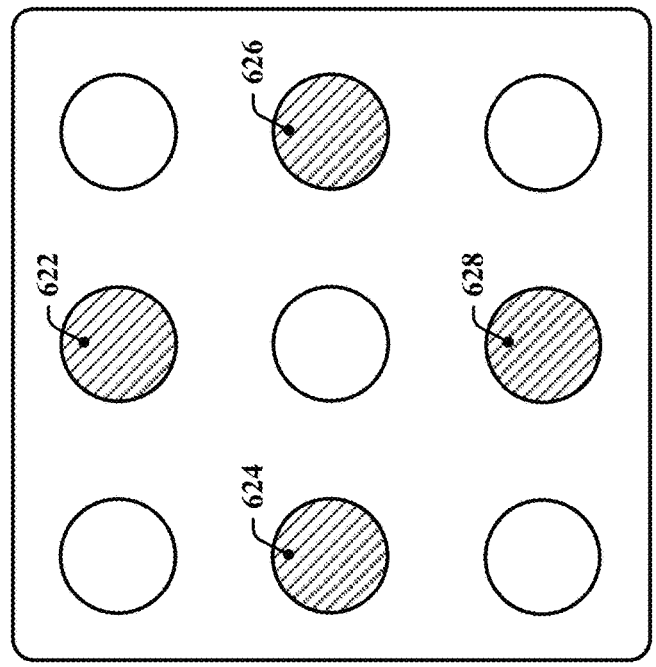
FIG. 6 illustrates certain aspects of a search conducted when each charging cell includes multiple coils in accordance with certain aspects disclosed herein.
Figure 6:
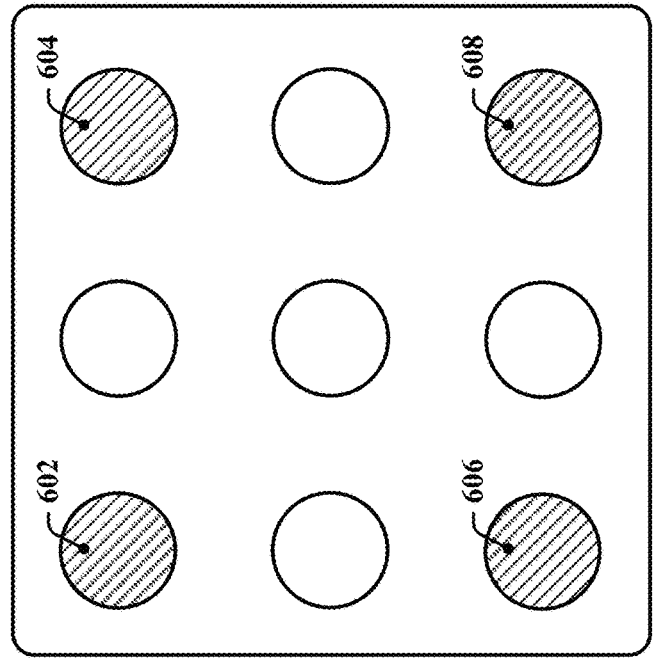

FIG. 6 illustrates certain aspects of a search conducted in a grouping of coils that includes multiple coils 602, 604, 606, 608, 622, 624, 626, 628. In some implementations, a search may be conducted by measuring differences in measurable properties of different groupings of coils 600, 620. In the illustrated example, a combined property of a first grouping of coils 600 that includes coils 602, 604, 606, 608 may be assessed independently of the combined property of a second grouping of coils 620 that includes coils 622, 624, 626, 628. The groupings of coils 600, 620 may be selected to increase the quantity to be measured through aggregation, or to cover a wider area during a single measurement. In one example, the capacitance associated with a stack of coils may be measured as an aggregate. In another example, the capacitance of coils at different locations in a charging surface may be measured to enable rapid detection of a device to be charged that is placed on the charging surface serviced by the measured coils.

Figure 7:
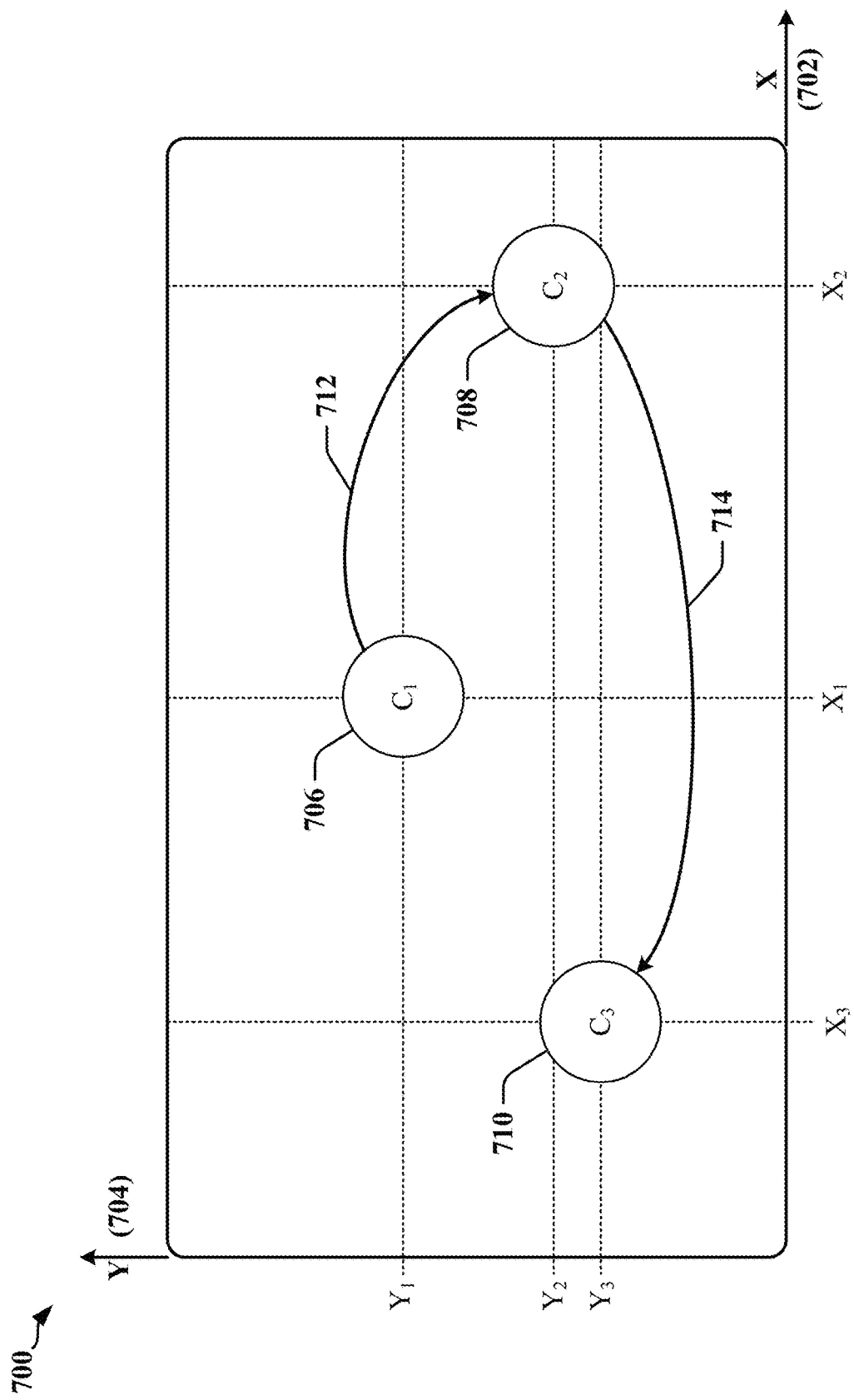
FIG. 7 illustrates a charging surface with multiple charging cells, including the three illustrated charging cells involved in a search conducted in accordance with certain aspects disclosed herein.
Figure 8:
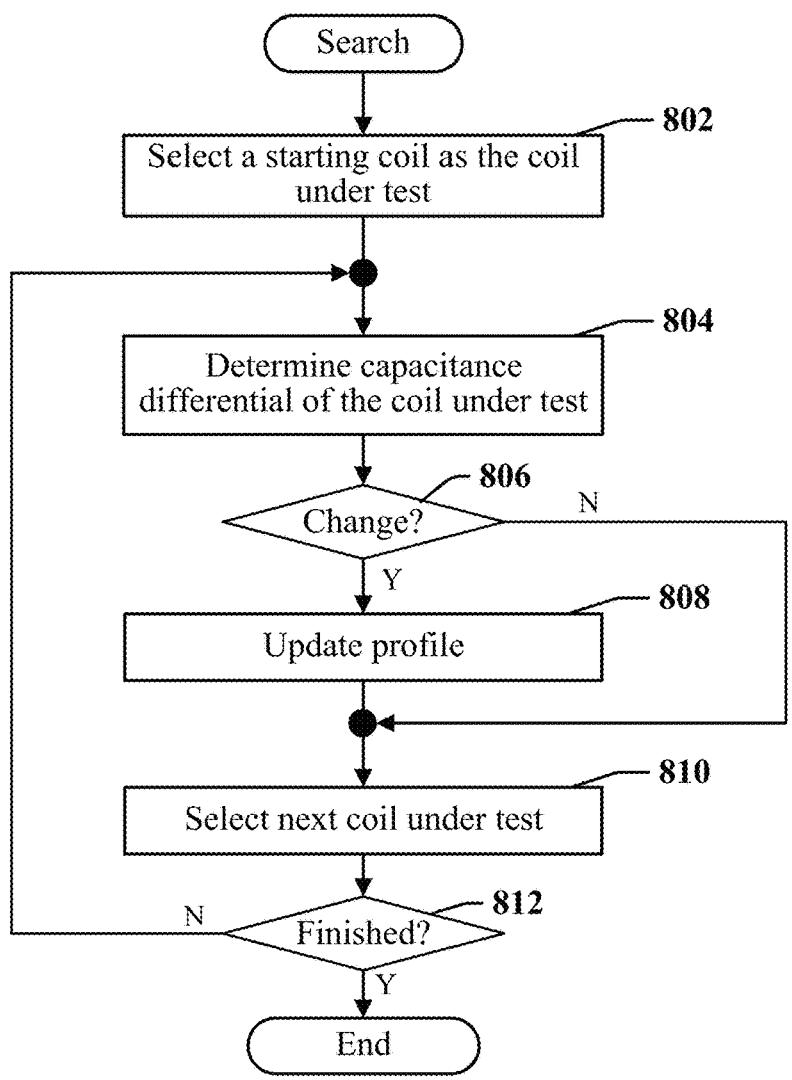
FIG. 8 is a flowchart illustrating a search process that may be conducted by a charging device in accordance with certain aspects disclosed herein.

FIGS. 7 and 8 illustrate certain aspects of a search conducted using differential capacitive sensing. FIG. 7 illustrates a two-dimensional view (X axis 702 and Y axis 704) of a charging surface 700, which is provided with one or more charging cells that include the three illustrated charging coils 706, 708, 710. Certain aspects illustrated by FIG. 7 are also applicable to searches involving individual coils within a charging coil 706, 708, 710 or spread throughout a charging surface 700 and/or in a three-dimensional space. In the illustrated example, the charging coils 706, 708, 710 are the first three charging coils tested during a search, which may be conducted as a pseudorandom search. The search commences at a first charging coil 706. The search pattern may cause testing to move 712 to a second charging coil 708, and may then cause testing to move 714 to a third charging coil 710. The search may be conducted to identify the general location of a receiving device and may be stopped when a measurement indicating presence of a receiving device is obtained. A second, area-specific search may then be conducted around the charging coil 706, 708, 710.

FIG. 8 is a flowchart 800 illustrating a search process that may be conducted by a charging device to determine if, or where, a device to be charged has been placed on a charging surface. The flowchart 800 may relate to individual coils provided within a charging device, to groups of coils stacked in proximity along a common axis, and/or groups of coils provided in a single charging coil 706, 708, 710 or servicing an area of interest of the charging surface (see also FIG. 6).

At block 802, an initial coil or group of coils is selected as a starting point for the search. The starting point may be selected using a pseudorandom number generator, or the like. In some instances, the starting point may be selected from a group of potential starting points that may be known or expected to be near locations that have a higher probability that a device to be charged to be present. For example, a charging device may maintain a history of searches and/or charging events that identify the location of a device that was charged and/or the charging coils or charging cells that are most frequently activated to charge devices.

At block 804, the charging device may obtain measurements of capacitance of conductors in one or more coils, or some other property associated with the coils or charging surface that may be altered in the presence of a device to be charged. The charging device may determine if the value measured property has changed from a previously measured value of the property, a nominal value, and/or values measured at a different site on the charging surface.

If a change is detected at block 804, the charging device may update a profile of the charging surface at block 808. For example, the profile may be modified to reflect the new value and/or the size of the change in the value. The profile may be used to map the potential location of a device to be charged and/or to remap or unmap devices that have been moved or removed from the charging surface. In some instances, the detection of a change or difference in the measured property may cause the charging device to initiate a ping using a charging coil that exhibited a change or triggering property value. If no change was detected at block 806, or no charging process initiated at block 808, the search may continue at block 810.

At block 810, the charging device may select a next coil to be measured. The selection may be made based on a pseudorandom sequence, using a pseudorandom number generator to select a next coil. If at block 812 it is determined that all coils to be tested have been tested, the search may be terminated. If additional coils remain to be tested, the search may continue at block 804.

When a search identifies a potential device placement on the charging surface, the charging device may begin a ping procedure to identify a charging cell, a combination of charging cells and/or a combination of coils that are to be activated to charge the device placed on the charging surface. The ping procedure verifies that the device to be charged is compatible with the charging device, and may identify a signal strength indicating whether the coils used to transmit the ping are best positioned for the requested or desired charging procedure.

Significant power savings can be achieved when a search is conducted to locate a device placed on or near in a multi-coil, free position charging pad before using pings to establish that the device is configured to receive charge from a wireless charging device. The savings in power consumption can be obtained by refraining from providing pings until a device is detected in a search, and by limiting ping transmissions to transmitting coils that are placed in proximity to the detected device and likely to be capable of establishing an electromagnetic charging connection with the detected device.

Passive Ping

Wireless charging devices may be adapted in accordance with certain aspects disclosed herein to support a low-power discovery technique that can replace and/or supplement conventional ping transmissions. A conventional ping is produced by driving a resonant LC circuit that includes a transmitting coil of a base station. The base station then waits for an amplitude-shift keying (ASK)-modulated response from the receiving device. A low-power discovery technique may include utilizing a passive ping to provide fast and/or low-power discovery. According to certain aspects, a passive ping may be produced by driving a network that includes the resonant LC circuit with a fast pulse that includes a small amount of energy. The fast pulse excites the resonant LC circuit and causes the network to oscillate at its natural resonant frequency until the injected energy decays and is dissipated. In one example, the fast pulse may have a duration corresponding to a half cycle of the resonant frequency of the network and/or the resonant LC circuit. When the base station is configured for wireless transmission of power within the frequency range 100 kHz to 200 kHz, the fast pulse may have a duration that is less than 2.5 μs.

The passive ping may be characterized and/or configured based on the natural frequency at which the network including the resonant LC circuit rings, and the rate of decay of energy in the network. The ringing frequency of the network and/or resonant LC circuit may be defined as:

$$\omega = \frac{1}{\sqrt{LC}} \quad \text{(Eq. 1)}$$

The rate of decay is controlled by the quality factor (Q factor) of the oscillator network, as defined by:

$$Q = \frac{1}{R}\sqrt{\frac{L}{C}} \quad \text{(Eq. 2)}$$

Equations 1 and 2 show that resonant frequency is affected by L and C, while the Q factor is affected by L, C and R. In a base station provided in accordance with certain aspects disclosed herein, the wireless driver has a fixed value of C determined by the selection of the resonant capacitor. The values of L and R are determined by the wireless transmitting coil and by an object or device placed adjacent to the wireless transmitting coil.

The wireless transmitting coil is configured to be magnetically coupled with a receiving coil in a device placed within close proximity of the transmitting coil, and to couple some of its energy into the proximate device to be charged. The L and R values of the transmitter circuit can be affected by the characteristics of the device to be charged, and/or other objects within close proximity of the transmitting coil. As an example, if a piece of ferrous material with a high magnetic permeability placed near the transmitter coils can increase the total inductance (L) of the transmitter coil, resulting in a lower resonant frequency, as shown by Equation 1. Some energy may be lost through heating of materials due to eddy current induction, and these losses may be characterized as an increase the value of R thereby lowering the Q factor, as shown by Equation 2.

A wireless receiver placed in close proximity to the transmitter coil can also affect the Q factor and resonant frequency. The receiver may include a tuned LC network with a high Q which can result in the transmitter coil having a lower Q factor. The resonant frequency of the transmitter coil may be reduced due to the addition of the magnetic material in the receiver, which is now part of the total magnetic system. Table 1 illustrates certain effects attributable to different types of objects placed within close proximity to the transmitter coil.

TABLE 1

| Object | L | R | Q | Frequency |
|---|---|---|---|---|
| None present | Base Value | Base value | Base Value (High) | Base Value |
| Ferrous | Small Increase | Large Increase | Large Decrease | Small Decrease |
| Non-ferrous | Small Decrease | Large Increase | Large Decrease | Small Increase |
| Wireless Receiver | Large Increase | Small Decrease | Small Decrease | Large Decrease |

Figure 9:
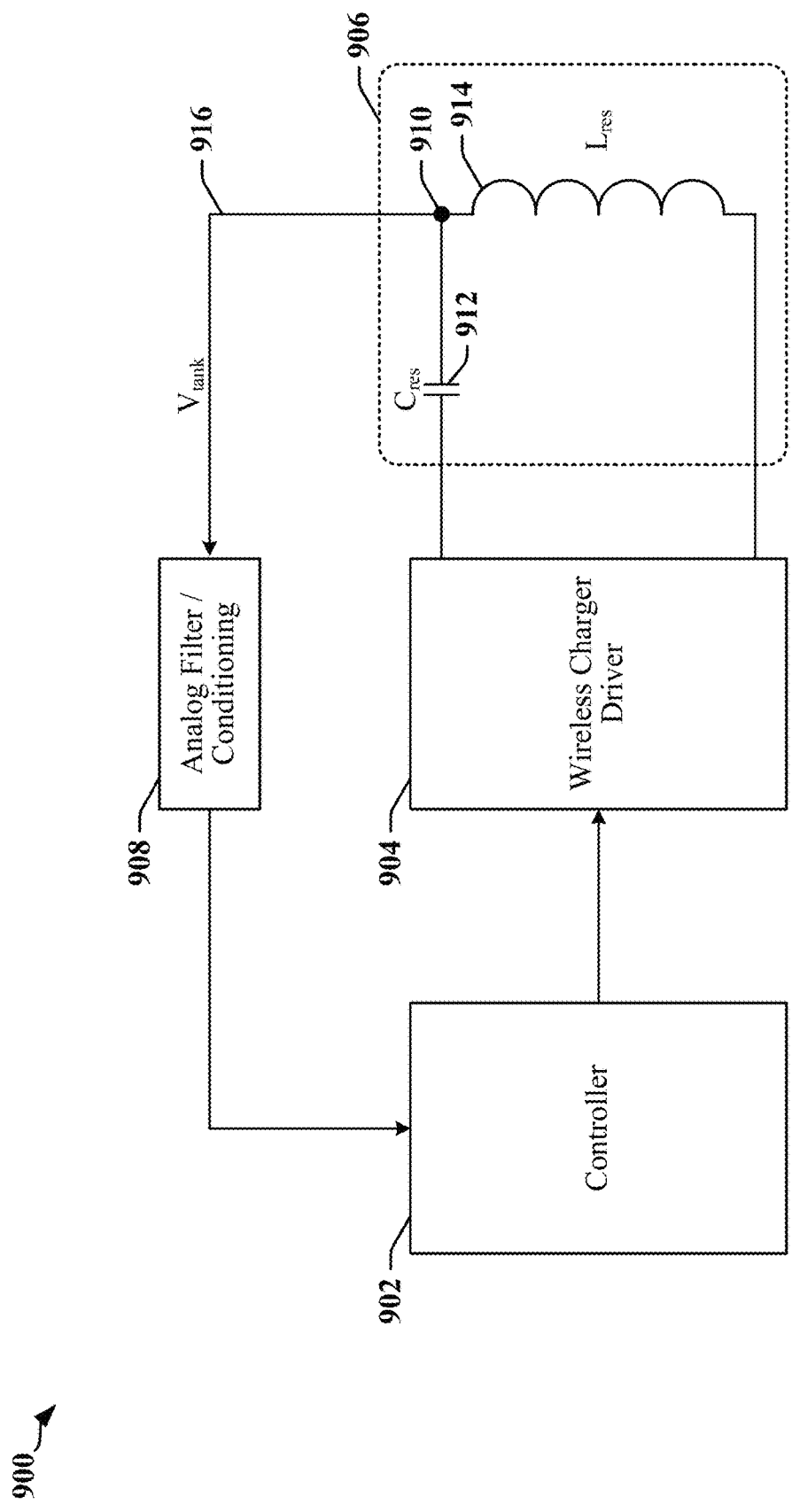
FIG. 9 illustrates a wireless transmitter that may be provided in a charger base station in accordance with certain aspects disclosed herein.

FIG. 9 illustrates a wireless transmitter 900 that may be provided in a charger base station. A controller 902 may receive a feedback signal filtered or otherwise processed by a filter circuit 908. The controller may control the operation of a driver circuit 904 that provides an alternating current to a resonant circuit 906 that includes a capacitor 912 and inductor 914. The voltage 916 measured at an LC node 910 of the resonant circuit 906.

Passive ping techniques may use the voltage and/or current measured or observed at the LC node 910 to identify the presence of a receiving coil (PRx) in proximity to the charging pad of a device adapted in accordance with certain aspects disclosed herein. In many conventional wireless charger transmitters, circuits are provided to measure voltage at the LC node 910 or the current in the network. These voltages and currents may be monitored for power regulation purposes and/or to support communication between devices. In the example illustrated in FIG. 9, voltage at the LC node 910 is monitored, although it is contemplated that current may additionally or alternatively be monitored to support passive ping. A response of the resonant circuit 906 to a passive ping (initial voltage $V_0$) may be represented by the voltage ($V_{LC}$) at the LC node 910, such that:

$$V_{LC} = V_0 e^{-\left(\frac{\omega}{2Q}\right)t} \quad \text{(Eq. 3)}$$

Figure 10:
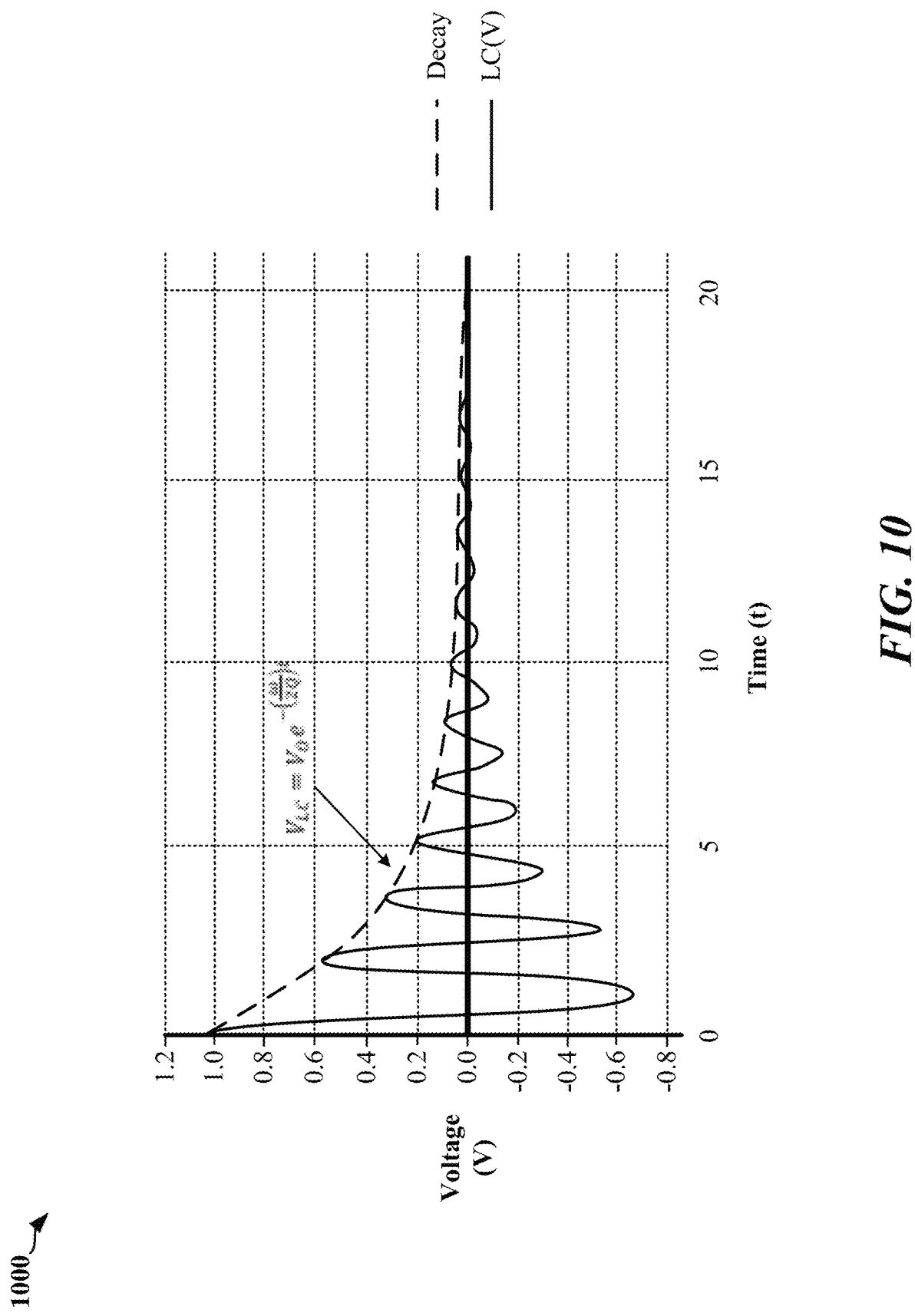
FIG. 10 illustrates a first example of a response to a passive ping in accordance with certain aspects disclosed herein.

FIG. 10 illustrates a first example in which a response 1000 to a passive ping decays according to Equation 3. After the excitation pulse at time=0, the voltage and/or current is seen to oscillate at the resonant frequency defined by Equation 1, and with a decay rate defined by Equation 3. The first cycle of oscillation begins at voltage level $V_0$ and $V_{LC}$ continues to decay to zero as controlled by the Q factor and ω. The example illustrated in FIG. 10 represents a typical open or unloaded response when no object is present or proximate to the charging pad. In FIG. 10 the value of the Q factor is assumed to be 20.

Figure 11:
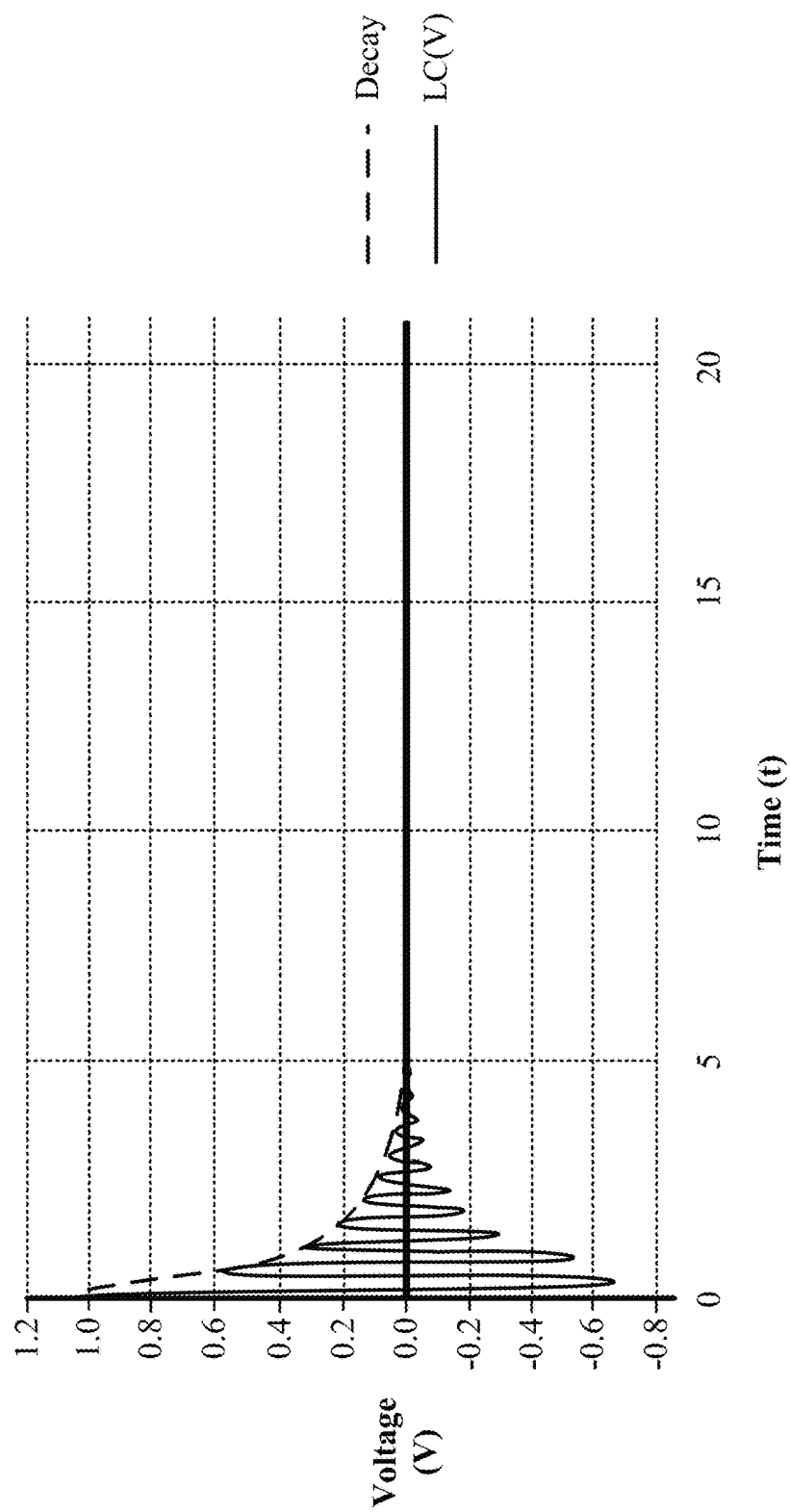
FIG. 11 illustrates a second example of a response to a passive ping in accordance with certain aspects disclosed herein.

FIG. 11 illustrates a second example in which a response 1100 to a passive ping decays according to Equation 3. After the excitation pulse at time=0, the voltage and/or current is seen to oscillate at the resonant frequency defined by Equation 1, and with a decay rate defined by Equation 3. The first cycle of oscillation begins at voltage level $V_0$ and $V_{LC}$ continues to decay to zero as controlled by the Q factor and ω. The example illustrated in FIG. 11 represents a loaded response when an object is present or proximate to the charging pad loads the coil. In FIG. 10 the Q factor may have a value of 7. $V_{LC}$ oscillates at a higher frequency in the voltage response 1100 with respect to the voltage response 1000.

Figure 12:
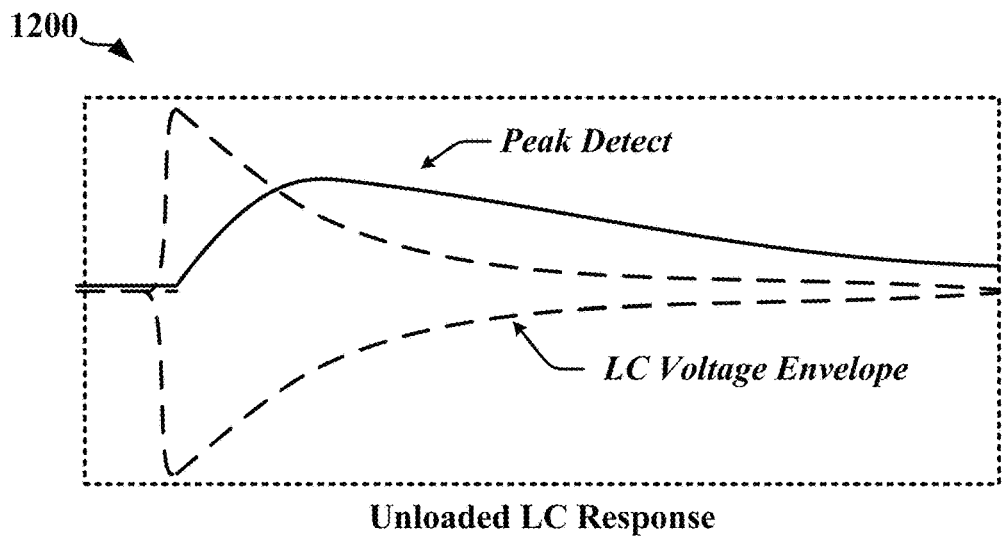
FIG. 12 illustrates examples of observed differences in responses to a passive ping in accordance with certain aspects disclosed herein.
Figure 12:
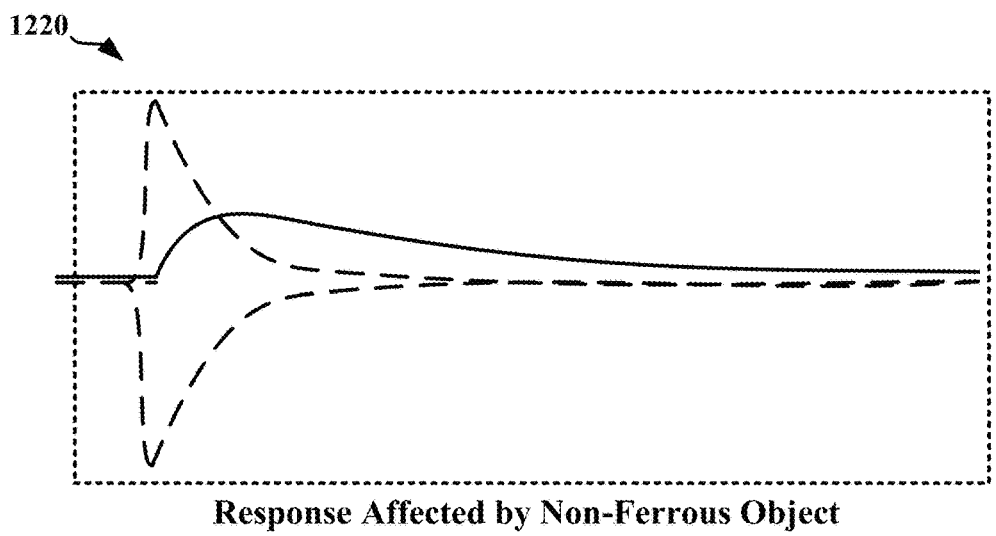
Figure 12:
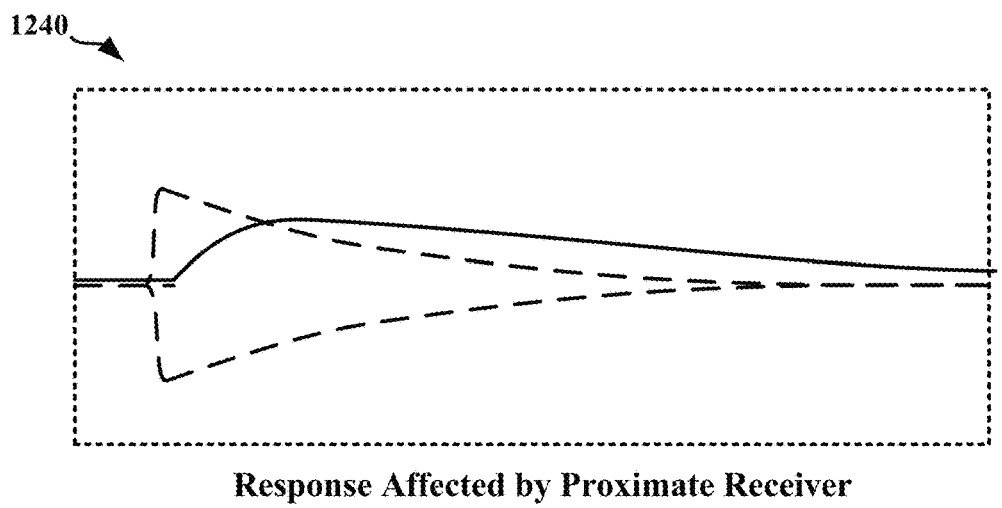

FIG. 12 illustrates a set of examples in which differences in responses 1200, 1220, 1240 may be observed. A passive ping is initiated when a driver circuit 904 excites the resonant circuit 906 using a pulse that is shorter than 2.5 μs.

Different types of wireless receivers and foreign objects placed on the transmitter result in different responses observable in the voltage at the LC node 910 or current in the resonant circuit 906 of the transmitter. The differences may indicate variations in the Q factor of the resonant circuit 906 frequency of the oscillation of $V_0$. Table 2 illustrates certain examples of objects placed on the charging pad in relation to an open state.

TABLE 2

| Object | Frequency | $V_{peak}$ (mV) | 50% Decay Cycles | Q Factor |
|---|---|---|---|---|
| None present | 96.98 kHz | 134 mV | 4.5 | 20.385 |
| Type-1 Receiver | 64.39 kHz | 82 mV | 3.5 | 15.855 |
| Type-2 Receiver | 78.14 kHz | 78 mV | 3.5 | 15.855 |
| Type-3 Receiver | 76.38 kHz | 122 mV | 3.2 | 14.496 |
| Misaligned Type-3 Receiver | 210.40 kHz | 110 mV | 2.0 | 9.060 |
| Ferrous object | 93.80 kHz | 110 mV | 2.0 | 9.060 |
| Non-ferrous object | 100.30 kHz | 102 mV | 1.5 | 6.795 |

In Table 2, the Q factor may be calculated as follows:

$$Q = \frac{\pi N}{ln(2)} \cong 4.53N, \quad \text{(Eq. 3)}$$

where N is the number of cycles from excitation until amplitude falls below 0.5 $V_0$.

Figure 13:
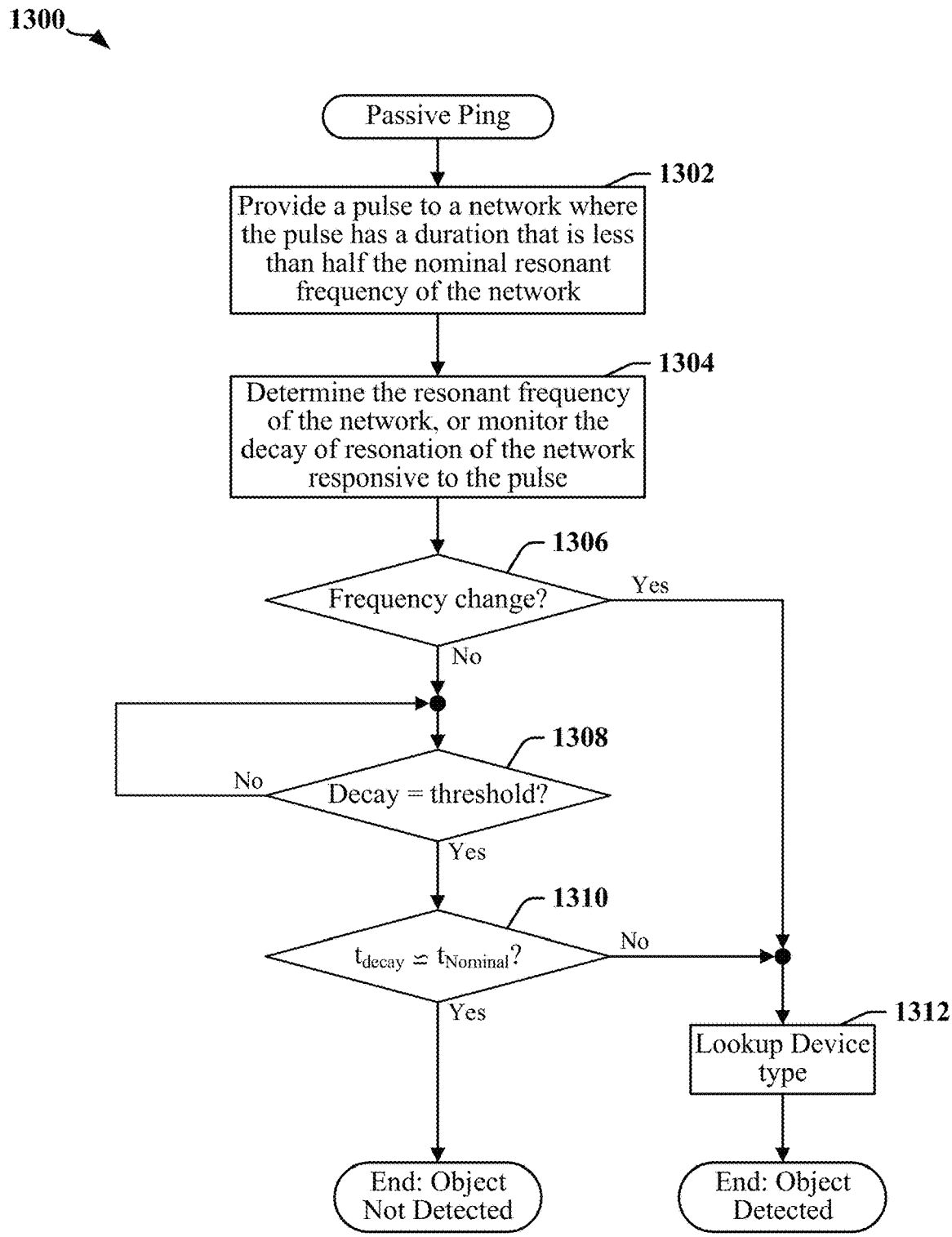
FIG. 13 is a flowchart that illustrates a method involving passive ping implemented in a wireless charging device adapted in accordance with certain aspects disclosed herein.

FIG. 13 is a flowchart 1300 that illustrates a method involving passive ping implemented in a wireless charging device adapted in accordance with certain aspects disclosed herein. At block 1302, a controller may generate a short excitation pulse and may provide the short excitation pulse to a network that includes a resonant circuit. The network may have a nominal resonant frequency and the short excitation pulse may have a duration that is less than half the nominal resonant frequency of the network. The nominal resonant frequency may be observed when the transmitting coil of the resonant circuit is isolated from external objects, including ferrous objects, non-ferrous objects and/or receiving coils in a device to be charged. In some examples, the short excitation pulse has a duration corresponding to one or more cycles of the nominal resonant frequency of the network. In some examples, the short excitation pulse has a duration corresponding to at least five cycles of the nominal resonant frequency of the network.

At block 1304, the controller may determine the resonant frequency of the network or may monitor the decay of resonation of the network responsive to the pulse. According to certain aspects disclosed herein, the resonant frequency and/or the Q factor associated with the network may be altered when a device or other object is placed in proximity to the transmitting coil. The resonant frequency may be increased or decreased from the nominal resonant frequency observed when the transmitting coil of the resonant circuit is isolated from external objects. The Q factor of the network may be increased or decreased with respect to a nominal Q factor measurable when the transmitting coil of the resonant circuit is isolated from external objects. According to certain aspects disclosed herein, the duration of delay can be indicative of the presence or type of an object placed in proximity to the transmitting coil when differences in Q factor prolong or accelerate decay of amplitude of oscillation in the resonant circuit with respect to delays associated with a nominal Q factor.

In one example, the controller may determine the resonant frequency of the network using a transition detector circuit configured to detect zero crossings of a signal representative of the voltage at the LC node 910 using a comparator or the like. In some instances, direct current (DC) components may be filtered from the signal to provide a zero crossing. In some instances, the comparator may account for a DC component using an offset to detect crossings of a common voltage level. A counter may be employed to count the detected zero crossings. In another example the controller may determine the resonant frequency of the network using a transition detector circuit configured to detect crossings through a threshold voltage by a signal representative of the voltage at the LC node 910, where the amplitude of the signal is clamped or limited within a range of voltages that can be detected and monitored by logic circuits. In this example, a counter may be employed to count transitions in the signal. The resonant frequency of the network may be measured, estimated and/or calculated using other methodologies.

In another example, a timer or counter may be employed to determine the time elapsed for $V_{LC}$ to decay from voltage level $V_0$ to a threshold voltage level. The elapsed time may be used to represent a decay characteristic of the network. The threshold voltage level may be selected to provide sufficient granularity to enable a counter or timer to distinguish between various responses 1200, 1220, 1240 to the pulse. $V_{LC}$ may be represented by detected or measured peak, peak-to-peak, envelope and/or rectified voltage level. The decay characteristic of the network may be measured, estimated and/or calculated using other methodologies.

If at block 1306, the controller determines that a change in resonant frequency with respect to a nominal resonant frequency indicate presence of an object in proximity to the transmitting coil, the controller may attempt to identify the object at block 1312. If the controller determines at block 1306 that resonant frequency is substantially the same as the nominal resonant frequency, the controller may consider the decay characteristic of the amplitude of oscillation in the resonant circuit at block 1308. The controller may determine that the resonant frequency of the network is substantially the same as the nominal resonant frequency when the frequency remains within a defined frequency range centered on, or including the nominal resonant frequency. In some implementations, the controller may identify objects using changes in resonant frequency and decay characteristics. In these latter implementations, the controller may continue at block 1308 regardless of resonant frequency, and may use a change in resonant frequency as an additional parameter when identifying an object positioned proximately the transmission coil.

At block 1308, the controller may use a timer and/or may count the cycles of the oscillation in the resonant circuit that have elapsed between the initial $V_O$ amplitude and a threshold amplitude used to assess the decay characteristic. In one example, $V_O/2$ may be selected as the threshold amplitude. At block 1310, the number of cycles or the elapsed time between the initial $V_O$ amplitude and the threshold amplitude may be used to characterize decay in the amplitude of oscillation in the resonant circuit, and to compare the characterize decay with a corresponding nominal decay characteristic. If at block 1310, no change in frequency and delay characteristic is detected, the controller may terminate the procedure with a determination that no object is proximately located to the transmission coil. If at block 1310, a change in frequency and/or delay characteristic has been detected, the controller may identify the object at block 1312.

At block 1312, the controller may be configured to identify receiving devices placed on a charging pad. The controller may be configured to ignore other types of objects, or receiving devices that are not optimally placed on the charging pad including, for example, receiving devices that are misaligned with the transmission coil that provides the passive ping. In some implementations, the controller may use a lookup table indexed by resonant frequency, decay time, change in resonant frequency, change in decay time and/or Q factor estimates. The lookup table may provide information identifying specific device types, and/or charging parameters to be used when charging the identified device or type of device.

In some examples, passive ping uses a very short excitation pulse that can be less than a half-cycle of the nominal resonant frequency observed at the LC node 910 in the resonant circuit 906. A conventional ping may actively drive a transmission coil for more than 16,000 cycles. The power and time consumed by a conventional ping can exceed the power and time use of a passive ping by several orders of magnitude. In one example, a passive ping consumes approximately 0.250 per ping with a max ping time of around ~100 μs, while a conventional active ping consumes approximately 80 mJ per ping with a max ping time of around 90 ms. In this example, energy dissipation may be reduced by a factor of 320,000 and the time per ping may be reduced by a factor of 900.

Passive ping may also be coupled with another, reduced-power sensing methodology, such as capacitive sensing. Capacitive sensing or the like can provide an ultra-low power detection method that determines presence or non-presence of an object is in proximity to the charging surface. After capacitive sense detection, a passive ping can be transmitted sequentially or concurrently on each coil to produce a more accurate map of where a potential receiving device and/or object is located. After a passive ping procedure has been conducted, an active ping (e.g., active digital ping) may be provided in the most likely device locations. An example algorithm for device location sensing, identification and charging is illustrated in FIG. 14.

Figure 14:
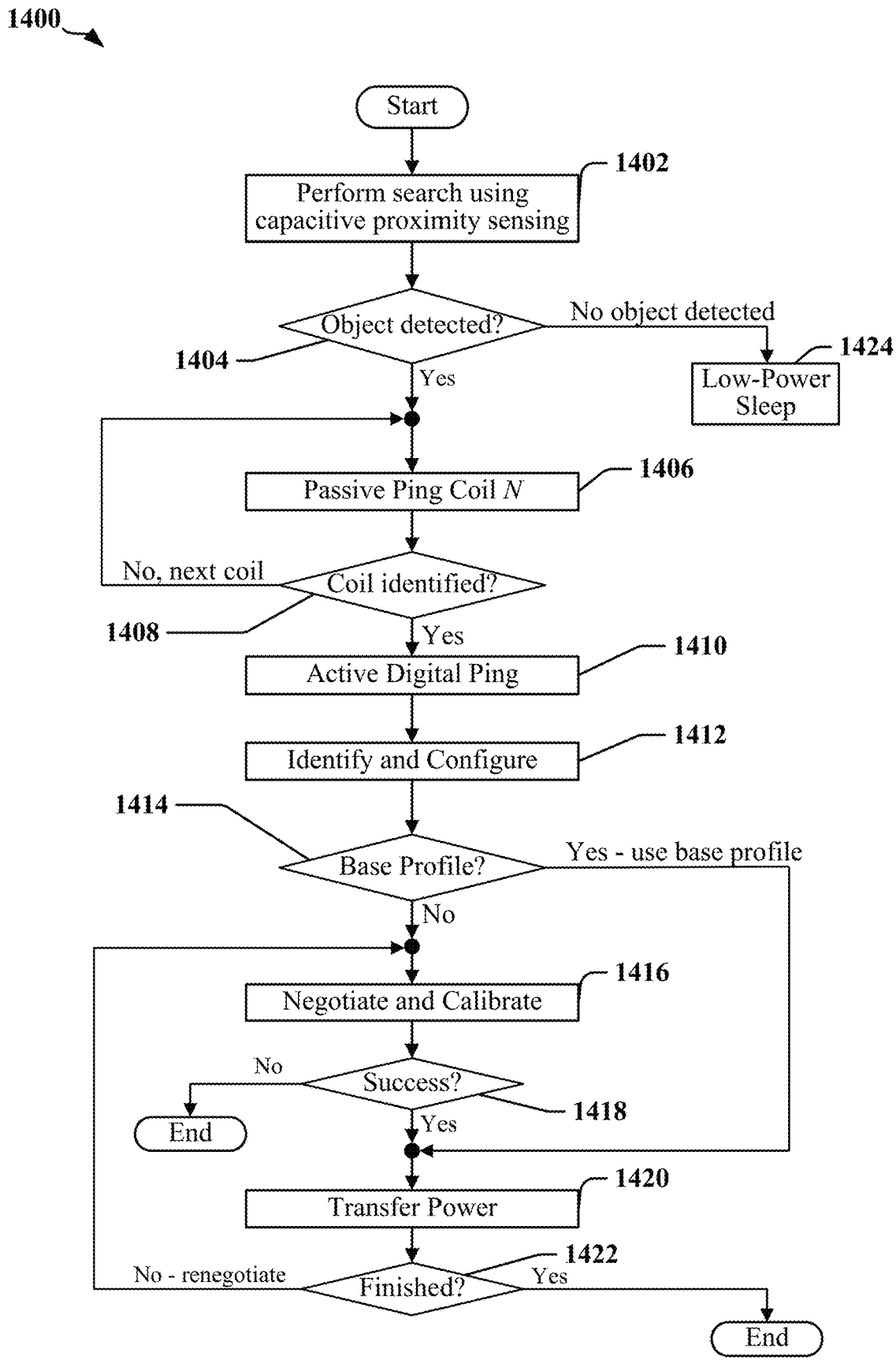
FIG. 14 is a flowchart that illustrates a power transfer management procedure that may be employed by a wireless charging device implemented in accordance with certain aspects disclosed herein.

FIG. 14 is a flowchart 1400 that illustrates a power transfer management procedure involving multiple sensing and/or interrogation techniques that may be employed by a wireless charging device implemented in accordance with certain aspects disclosed herein. The procedure may be initiated periodically and, in some instances, may be initiated after the wireless charging device exits a low-power or sleep state. In one example, the procedure may be repeated at a frequency calculated to provide sub-second response to placement of a device on a charging pad. The procedure may be re-entered when an error condition has been detected during a first execution of the procedure, and/or after charging of a device placed on the charging pad has been completed.

At block 1402, a controller may perform an initial search using capacitive proximity sensing. Capacitive proximity sensing may be performed quickly and with low power dissipation. In one example, capacitive proximity sensing may be performed iteratively, where one or more transmission coils is tested in each iteration. The number of transmission coils tested in each iteration may be determined by the number of sensing circuits available to the controller. At block 1404, the controller may determine whether capacitive proximity sensing has detected the presence or potential presence of an object proximate to one of the transmission coils. If no object is detected by capacitive proximity sensing, the controller may cause the charging device to enter a low-power, idle and/or sleep state at block 1424. If an object has been detected, the controller may initiate passive ping sensing at block 1406.

At block 1406, the controller may initiate passive ping sensing to confirm presence of an object near one or more transmission coils, and/or to evaluate the nature of the proximately-located object. Passive ping sensing may consume a similar quantity of power but span a greater of time than capacitive proximity sensing. In one example, each passive ping can be completed in approximately 100 μs and may expend 0.25 μJ. A passive ping may be provided to each transmission coil identified as being of interest by capacitive proximity sensing. In some implementations, a passive ping may be provided to transmission coils near each transmission coil identified as being of interest by capacitive proximity sensing, including overlaid transmission coils. At block 1408, the controller may determine whether passive ping sensing has detected the presence of a potentially chargeable device proximate to one of the transmission coils that may be a receiving device. If a potentially chargeable device has been detected, the controller may initiate active digital ping sensing at block 1410. If no potential chargeable device has been detected, passive ping sensing may continue at block 1406 until all of the coils have been tested and/or the controller terminates passive ping sensing. In one example, the controller terminates passive ping sensing after all transmitting coils have been tested. When passive ping sensing fails to find a potentially chargeable device, the controller may cause the charging device to enter a low-power, idle and/or sleep state. In some implementations, passive ping sensing may be paused when a potentially chargeable device is detected so that an active ping can be used to interrogate the potentially chargeable device. Passive ping sensing may be resumed after the results of an active ping have been obtained.

At block 1410, the controller may use an active ping to interrogate a potentially chargeable device. The active ping may be provided to a transmitting coil identified by passive ping sensing. In one example, a standards-defined active ping exchange can be completed in approximately 90 ms and may expend 80 mJ. An active ping may be provided to each transmission coil associated with a potentially chargeable device.

At block 1412, the controller may identify and configure a chargeable device. The active ping provided at block 1410 may be configured to stimulate a chargeable device such that it transmits a response that includes information identifying the chargeable device. In some instances, the controller may fail to identify or configure a potentially chargeable device detected by passive ping, and the controller may resume a search based on passive ping at block 1406. At block 1414, the controller may determine whether a baseline charging profile or negotiated charging profile should be used to charge an identified chargeable device. The baseline, or default charging profile may be defined by standards. In one example, the baseline profile limits charging power to 5 W. In another example, a negotiated charging profile may enable charging to proceed at up to 15 W. When a baseline charging profile is selected, the controller may begin transferring power (charging) at block 1420.

At block 1416, the controller may initiate a standards-defined negotiation and calibration process that can optimize power transfer. The controller may negotiate with the chargeable device to determine an extended power profile that is different from a power profile defined for the baseline charging profile. The controller may determine at block 1418 that the negotiation and calibration process has failed and may terminate the power transfer management procedure. When the controller determines at block 1418 that the negotiation and calibration process has succeeded, charging in accordance with the negotiate profile may commence at block 1420.

At block 1422, the controller may determine whether charging has been successfully completed. In some instances, an error may be detected when a negotiated profile is used to control power transfer. In the latter instance, the controller may attempt to renegotiate and/or reconfigure the profile at block 1416. The controller may terminate the power transfer management procedure when charging has been successfully completed.

Selectively Activating Coils

According to certain aspects disclosed herein, coils in one or more charging cells may be selectively activated to provide an optimal electromagnetic field for charging a compatible device. In some instances, coils may be assigned to charging cells, and some charging cells may overlap other charging cells. In the latter instances, the optimal charging configuration may be selected at the charging cell level. In other instances, charging cells may be defined based on placement of a device to be charged on a charging surface. In these other instances, the combination of coils activated for each charging event can vary. In some implementations, a charging device may include a driver circuit that can select one or more cells and/or one or more predefined charging cells for activation during a charging event.

Figure 15:
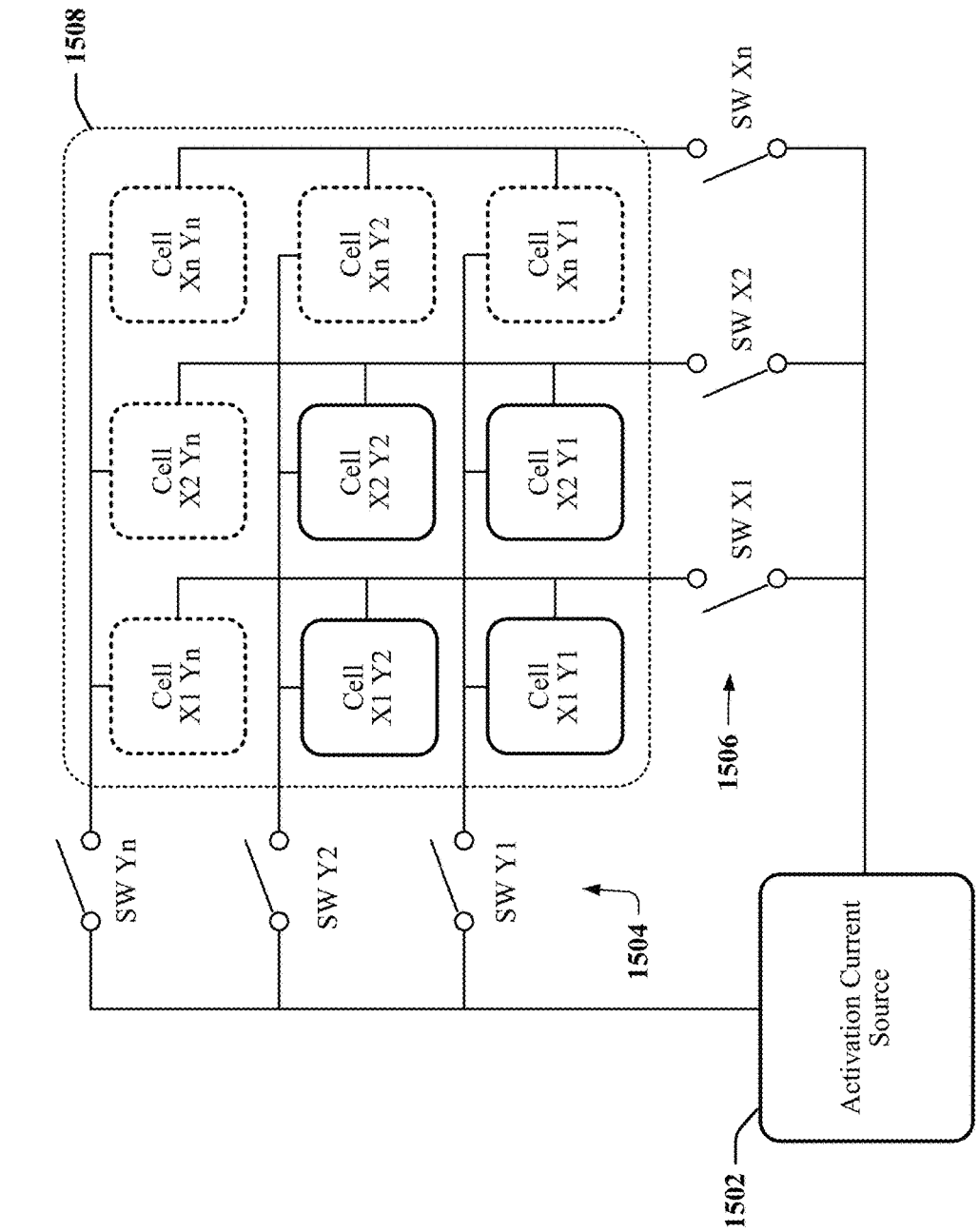
FIG. 15 illustrates a first topology that supports matrix multiplexing switching for use in a wireless charger adapted in accordance with certain aspects disclosed herein.

FIG. 15 illustrates a first topology 1500 that supports matrix multiplexing switching for use in a wireless charger adapted in accordance with certain aspects disclosed herein. The wireless charger may select one or more charging cells 100 to charge a receiving device. Charging cells 100 that are not in use can be disconnected from current flow. A relatively large number of charging cells 100 may be used in the honeycomb packaging configuration illustrated in FIG. 2 requiring a corresponding number of switches. According to certain aspects disclosed herein, the charging cells 100 may be logically arranged in a matrix 1508 having multiple cells connected to two or more switches that enable specific cells to be powered. In the illustrated topology 1500, a two-dimensional matrix 1508 is provided, where the dimensions may be represented by X and Y coordinates. Each of a first set of switches 1506 is configured to selectively couple a first terminal of each cell in a column of cells to a wireless transmitter and/or receiver circuit 1502 that provide current to activate coils during wireless charging. Each of a second set of switches 1504 is configured to selectively couple a second terminal of each cell in a row of cells to the wireless transmitter and/or receiver circuit 1502. A cell is active when both terminals of the cell are coupled to the wireless transmitter and/or receiver circuit 1502.

The use of a matrix 1508 can significantly reduce the number of switching components needed to operate a network of tuned LC circuits. For example, N individually connected cells require at least N switches, whereas a two-dimensional matrix 1508 having N cells can be operated with √N switches. The use of a matrix 1508 can produce significant cost savings and reduce circuit and/or layout complexity. In one example, a 9-cell implementation can be implemented in a 3×3 matrix 1508 using 6 switches, saving 3 switches. In another example, a 16-cell implementation can be implemented in a 4×4 matrix 1508 using 8 switches, saving 8 switches.

During operation at least 2 switches are closed to actively couple one coil to a wireless transmitter and/or receiver circuit 1502. Multiple switches can be closed at once in order to facilitate connection of multiple coils to the wireless transmitter and/or receiver circuit 1502. Multiple switches may be closed, for example, to enable modes of operation that drive multiple transmitting coils when transferring power to a receiving device.

Figure 16:
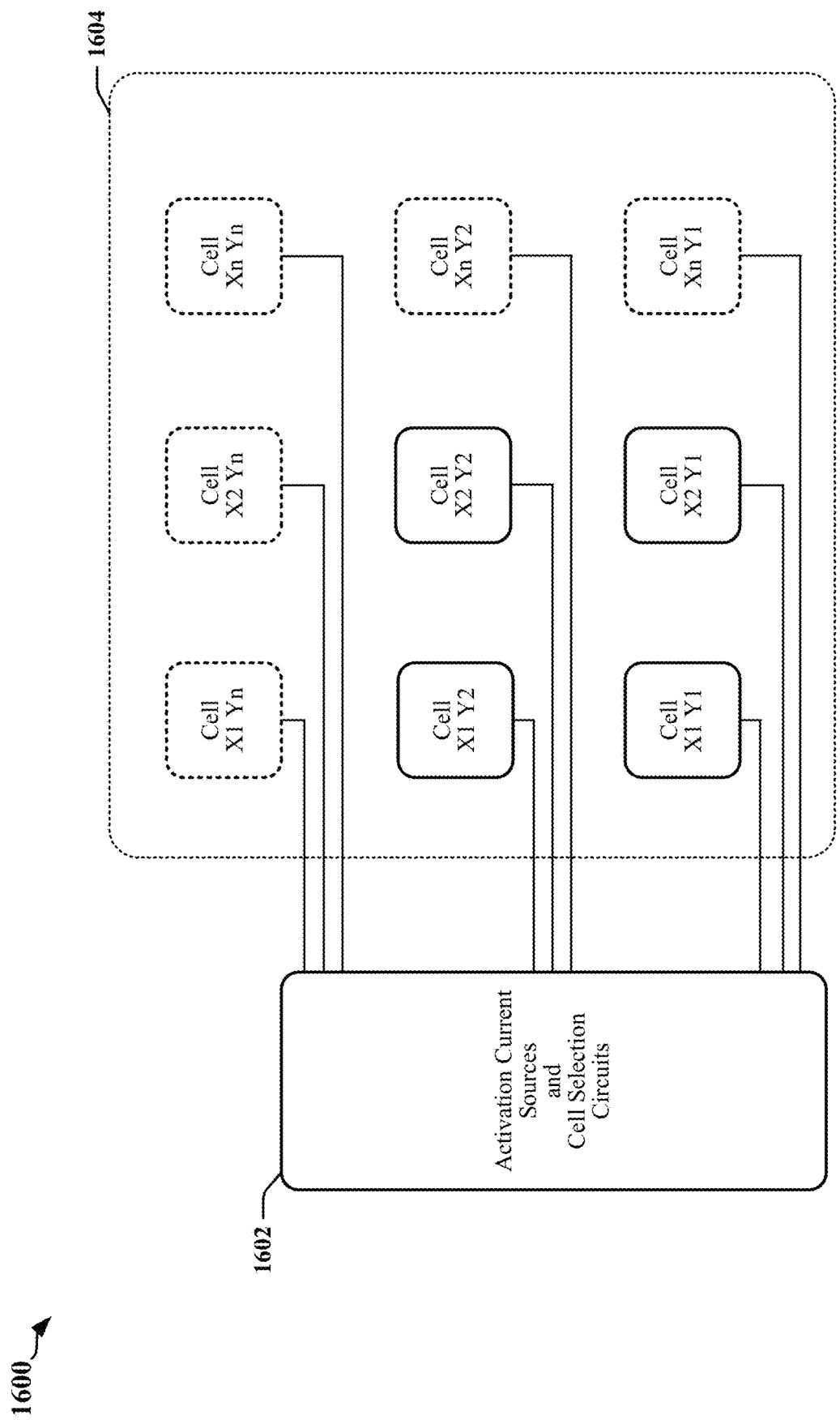
FIG. 16 illustrates a second topology that supports direct current drive in a wireless charger adapted in accordance with certain aspects disclosed herein.

FIG. 16 illustrates a second topology 1600 in which each coil or charging cell is individually and/or directly driven by a driver circuit 1602 in accordance with certain aspects disclosed herein. The driver circuit 1602 may be configured to select one or more coils or charging cells 100 from a group of coils 1604 to charge a receiving device. It will be appreciated that the concepts disclosed here in relation to charging cells 100 may be applied to selective activation of individual coils or stacks of coils. Charging cells 100 that are not in use receive no current flow. A relatively large number of charging cells 100 may be in use and a switching matrix may be employed to drive individual coils or groups of coils. In one example, a first switching matrix may configure connections that define a charging cell or group of coils to be used during a charging event and a second switching matrix (see, e.g., FIG. 15) may be used to activate the charging cell and/or group of selected coils.

The availability of direct drive to one or more coils may permit the charging device to concurrently transmit a ping through different groupings of coils 600, 620 (see FIG. 6).

In some implementations, capacitive sense can be used to determine location by first connecting two adjacent coils to the capacitive sense circuitry. Using these two coils the circuitry measures the capacitance by using one or more known methods. A first method includes applying a constant current waveform and calculating capacitance based on changes in voltage sensed by a measuring circuit. Calculation can be based on the following equations:

$$Q=C*V$$

$$Q=I*t$$

If a known charge is delivered (Q) by sourcing a known constant current (I) for a specified amount of time (t), the voltage (V) can be measured from which the capacitance (C) can be calculated. Measured capacitance can be compared to the last recorded measured value. Certain changes in capacitance are significant enough to indicate that the system has changed, enabling detection that something has become part of the system (e.g., a phone).

Changes in capacitance can be measured through the use of an RC time constant. A constantly varying square wave signal can be applied across a known resistance (R) and the unknown capacitance (C or Cx). The time to charge/discharge can them be measured using a timer and comparator. By using the time constant equation, capacitance can be calculated.

Capacitance measurements may be taken from coils in a defined sequence until all locations have been tested. Changes and/or magnitude of changes measured from the coils can identify location of a device to be charged. The process can be repeated in a cycle that may repeat based on a configured interval time. The scan rate may be selected based on a compromise between speed of detection and power draw. If lower power draw levels are desired scan rate can be decreased at the expense of lower detection speed or vice versa.

After sensing a device location, the location of one or more devices can be determined. Locations may be indicated by the combination of coils that register a large enough change in capacitance. Coils can be turned on in a first-come, first-serve basis. As devices are added, associated coils proximate to the device can be connected to a driver and activated. The number of devices that can be charged may be limited by the number drivers available to service devices.

Current flow through each of the coils is defined roughly by an appropriate wireless charging standard (e.g., the Qi standard), frequency, amplitude, etc. Certain aspects disclosed herein relate to identifying coils in an array activated using an array of switches and corresponding circuitry and/or algorithms.

According to certain aspects of this disclosure, the area that can be utilized for charging increases with the total surface area of the disclosed charging device. In conventional wireless chargers, a single Qi coil transmitter has an effective power transfer area that is <9.2% (based on the A6 coil, the most commonly used coil). A layout of coils provided in accordance with certain aspects disclosed herein can accomplish much higher ratios for charge area vs total area. In one example, a 100 mm×200 mm, 3-device configuration has an available charging area that is 57.2% of the charging device surface area. In another example, a 200 mm×200 mm, 6-device configuration has an available charging area that is 63.5% of the charging device surface area.

Device Detection Using Sensors

According to certain aspects, presence, position and/or orientation of a receiving device may be determined using a location sensing technique that involves, for example, detecting differences or changes in capacitance, resistance, inductance, touch, pressure, temperature, load, strain, and/or another appropriate type of sensing. Location sensing may be employed to determine presence or location of an object or device to be charged. Location sensing may also be employed to detect removal of a receiving device during power transfer from a charging surface.

Figure 17:
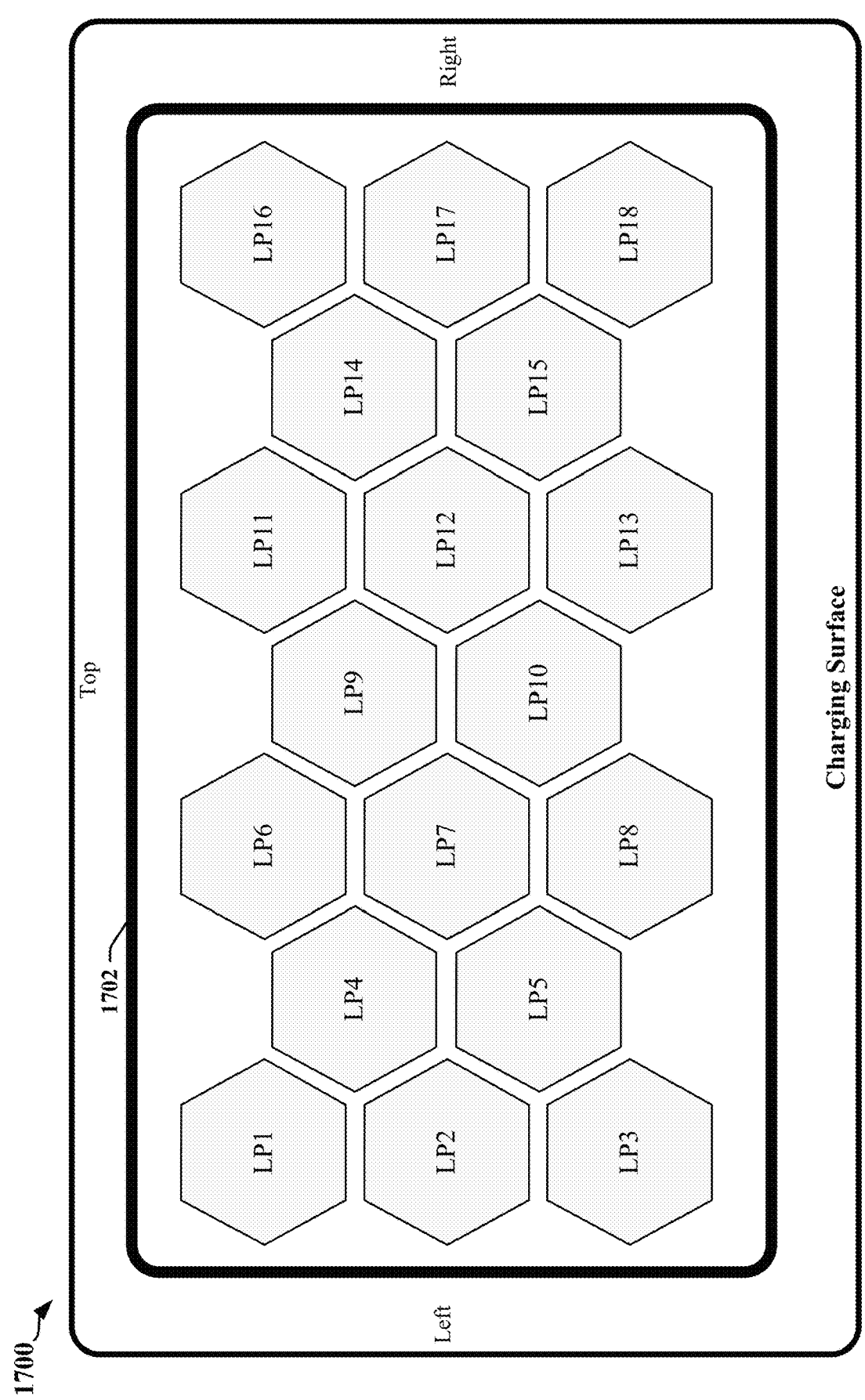
FIG. 17 illustrates an example of a charging surface and coils in accordance with aspects disclosed herein.

FIG. 17 illustrates a first example of a charging surface 1700 of a wireless charger that includes one or more sensors 1702 that can detect removal of a receiving device during power transfer from the charging surface 1700. In this example, the sensors 1702 may include capacitive, inductive, or hall effect sense elements configured to detect the presence of a device. In some implementations, the sense elements may border the charging coils (LP1-LP18) provided in the charging surface 1700. In some implementations, the sense elements may border individual charging coils or groups of charging coils. In certain implementations, charging zones may be identified on the charging surface 1700, and the sense elements may define or monitor the outer limits of each charging zone.

The sensors 1702 may also be used to detect changes indicative of removal of a receiving device from the charging surface 1700. In some implementations, the sensors 1702 may support or enhance removal detection techniques based on measurements of charging current, tank voltages and/or power draw. The use of sensors 1702 may improve reliability, efficiency and can reduce power consumption and processor loading.

Selection of Charging Coils Using Analog and Digital Ping

Figure 18:
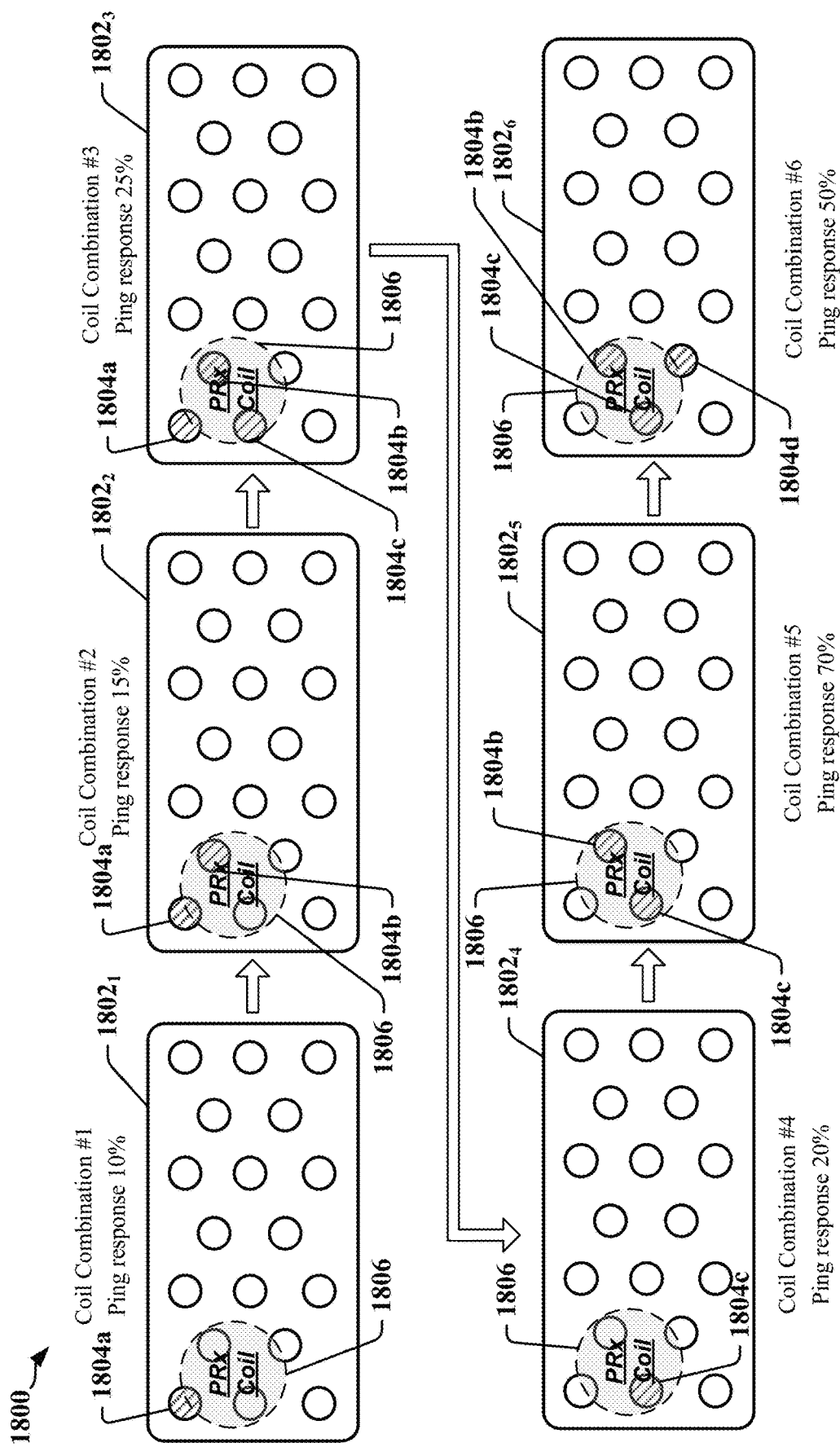
FIG. 18 illustrates a process for selection using pinging in wireless charging device according to aspects of the present disclosure.

FIG. 18 illustrates an example 1800 of an apparatus applying a selection methodology according to some aspects. In particular, the methodology illustrated in example 1800 is used to select a combination of charging coils that have the highest signal strength through the use of both passive (or analog) pings and active (or digital) pings. In a particular aspect, the disclosed selection provides a selection of a combination of charging coils that provide yield a strongest ping or, in other words, a combination of multiple coils that provides the best connection for a receiving device (PRx).

In this example, a wireless changing surface 1802 includes a number of coils 1804 similar to the example of FIG. 17 (e.g., coils LP1-LP18), except that the coils are represented as a circle geometry for sake of simplicity. In particular, when a power receiver (PRx) 1806 is placed in proximity with the charging surface 1802, and one or more charging coils 1804 are capable of effecting pinging of the PRx 1806 the methodology includes pinging each of a number of possible combinations of coils 1804. In the example of FIG. 18, each of the various possible coil combinations are illustrated by a number of different illustrations of the charging surface (i.e., $1802_1$, $1802_2$, $1802_3$, $1802_4$, $1802_5$, $1802_6$) each showing a different potential coil combinations.

As illustrated by the option denoted by $1802i$, a single activated coil 1804a (an activated coil being indicated by shading) is used to ping the PRx 1806. In a next option denoted by $1802_2$, two coils 1804a and 1804b are activated by the wireless charging device to ping the PRx 1806. In yet a next option denoted by $1802_3$, three coils 1804a, 1804b, and 1804c are activated to ping the PRx 1806, and so forth for the remainder of the six potential combinations illustrated by $1802_4$, $1802_5$, and $1802_6$. In this particular example, it is noted that the first combination shown by $1802i$, the activated coil 1804a is only partially covered by PR 1806 and the ping response might be a percentage of a maximum possible or expected response power level or as a percentage of transmitted power. In the particular example illustrated in FIG. 18, the ping response may be 10% of transmitted power, for example. In another coil combination having three activated coils 1804a, 1804b, and 1804c as shown at $1802_3$, for example, the ping response may be higher at 25%. As illustrated in FIG. 18, the various different combinations have differing levels of ping response, and the selection method may analyze the different ping response levels for all of the possible coil combinations and then select the highest or strongest ping response. In the example of FIG. 18, the coil combination shown at $1802_5$ would have the strongest ping response and this coil combination may be selected. As will be described below, the selection may involve the use of one or both of analog (passive) and digital (active) pings to more quickly determine the coil combination having the highest ping response for a particular PRx and its location on the charging surface. It is noted that for the example of FIG. 18, the combination of coils 1804b and 1804c as shown at $1802_5$ having a ping response of 70% would be selected as this combination has the highest ping response. This is merely exemplary, however, and the disclosure is not intended to be limited to any particular values or percentages.

Figure 19:
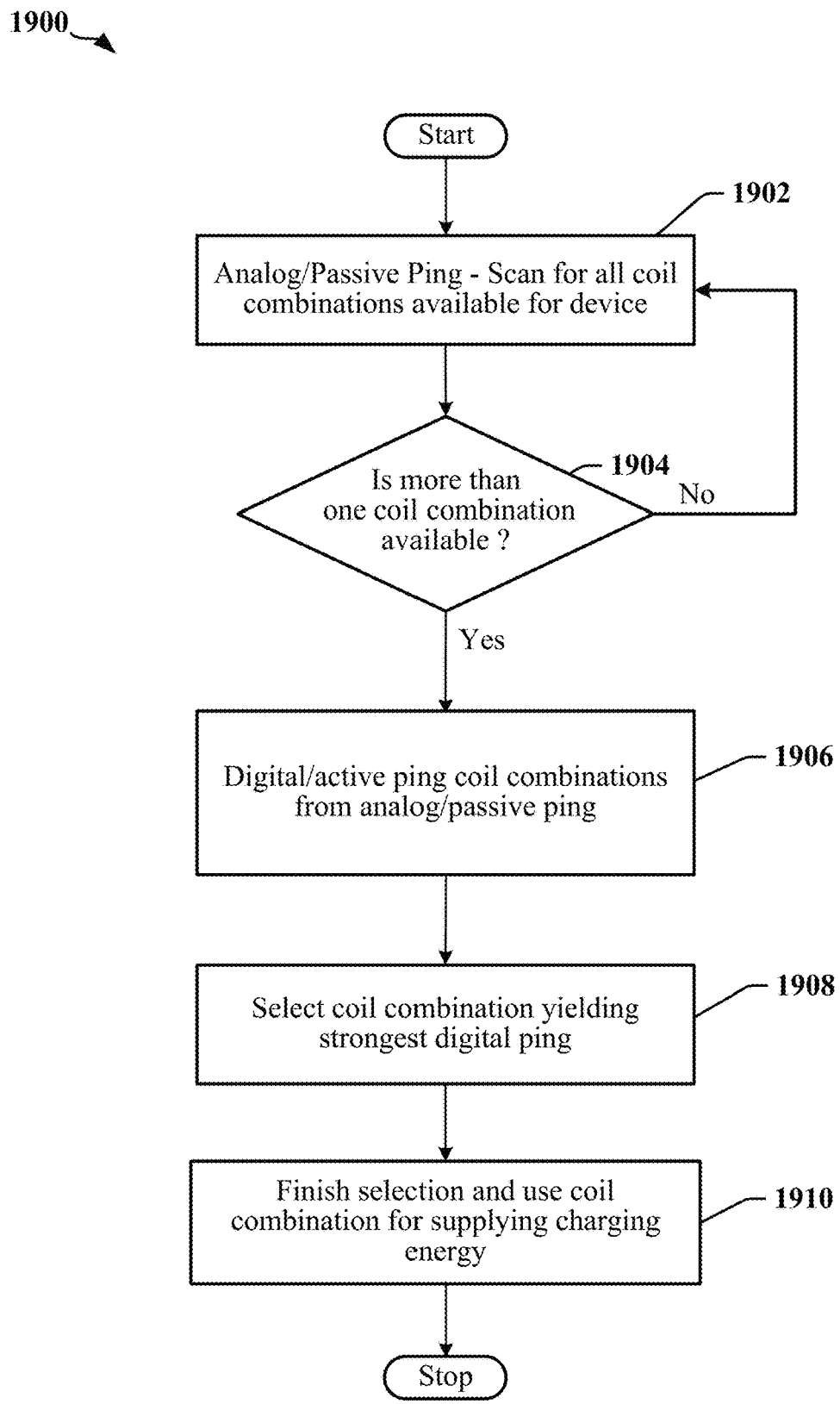
FIG. 19 illustrates a flow chart of a method for coil selection using pinging in wireless charging device.

FIG. 19 illustrates an example of a method 1900 for ping selection using both analog and digital pings for a best coil combination selection in a wireless charging device according to some aspects of the present disclosure. In the illustrated example of method 1900, the method starts with analog or passive pinging of the various coils in the wireless charging device in order to determine possible combinations for a PRx device on the charging surface (e.g., 1802) as shown at block 1902. In particular example, the wireless charging device may be configured to ping all possible coil combinations using analog or passive pings.

Since analog pings are generally quicker than digital pings, initial analog pinging allows the wireless charging device to more quickly determine where the PRx device is located on the charging surface as well as more quickly identify the potential coil combinations to be analyzed. In one aspect, the process in block 1902 may involve determining all coils that generate a ping response from the PRx to, in turn, be able to examine all possible combinations of those coils that yield a ping response. In other aspects, a threshold could be predefined such that only those coils receiving a ping response above the predetermined level among the set of all coils yielding a ping response could be used for the initial determination of the possible coil combinations.

After the scan of either all or a suitable subset of possible combinations is determined in block 1902, flow proceeds to decision block 1904 where a determination is made whether there are at least two different coil combinations available to select from. If not, then the need for selection is nonexistent or superfluous and flow returns to block 1902 to continue scanning for pings and attendant coil combinations for any receiving devices (PRx) or, if the receiving device PRx is subsequently moved, then scanning for multiple coil combinations that might develop after the PRx is moved.

If there are multiple available coil combinations as determined at block 1904, flow proceeds to block 1906 where digital pinging is performed for the various coil combinations determined in block 1902. In one example, the digital ping may be performed for all of the possible combinations identified in block 1902. According to another example, only those coil combinations that qualified to meet the predefined threshold may be digital pinged in the process of block 1906.

After digital pinging of the coil combinations in block 1906, a coil (in the case of a single coil such as may be seen at 18021) or coil combination having the highest or strongest digital ping is selected as shown at block 1908. After selection is made, the method 1900 may end as the selection is complete and the selected coil combination is then used for supplying charging energy for the PRx (e.g., 1806) as shown at block 1910. The selected coil combination may then be used to provide charging energy to the PRx device.

Figure 20:
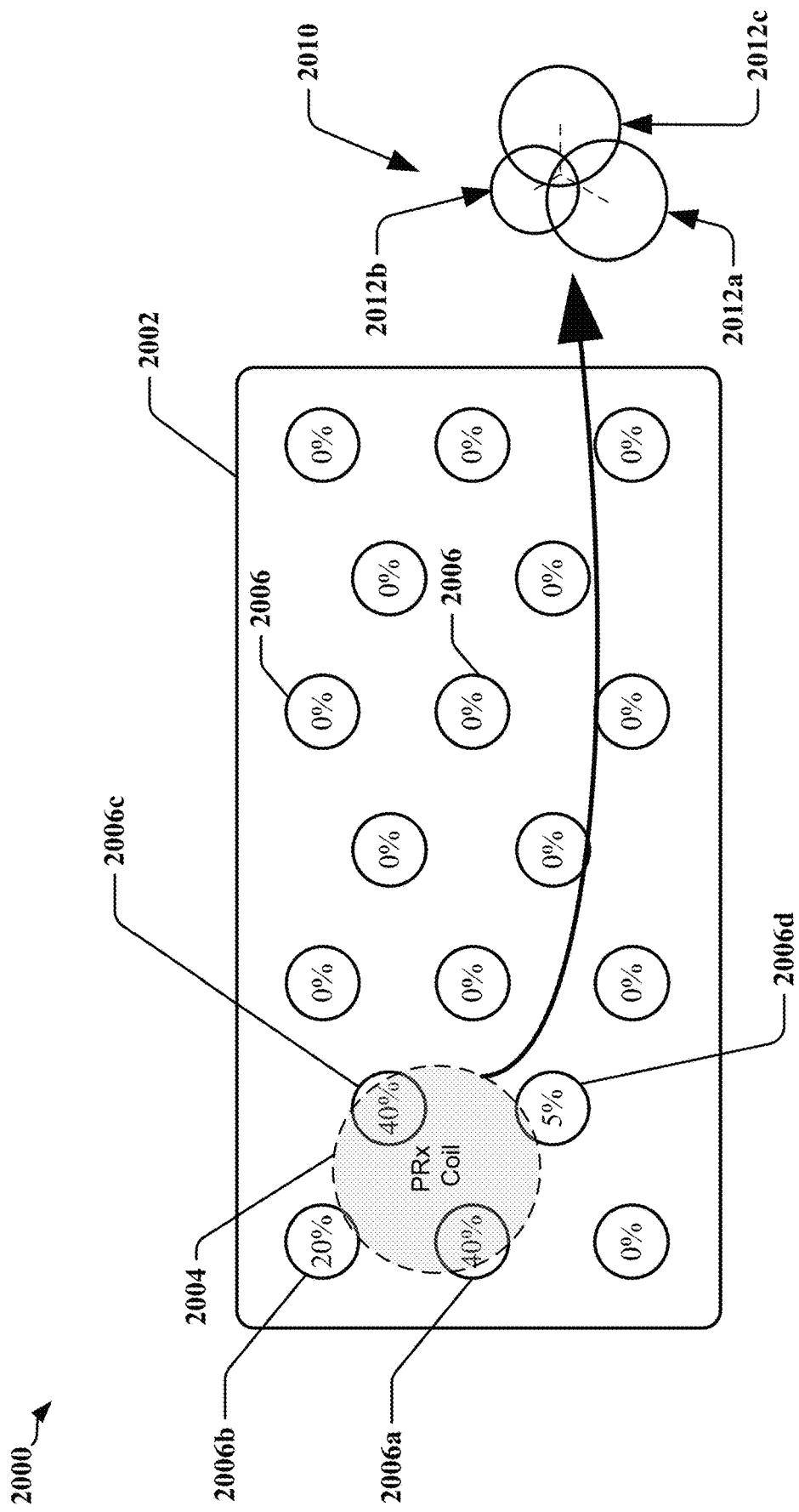
FIG. 20 illustrates another process for selection using pinging in wireless charging device according to aspects of the present disclosure

FIG. 20 illustrates another example 2000 of a coil selection methodology where each individual coil in a wireless charging device is activated, one at a time, in order to determine a location of receiver (PRx). As illustrated, a wireless charging device may have a charging surface 2002 having a receiving device (e.g., PRx coil) 2004 located in proximity thereto. In order to determine location of the PRx 2004, each individual coil 2006 may be activated to ping the PRx coil 2004, and then a relative strength is determined. For example, FIG. 20 illustrates that most of the coils 2006 will have a relative ping strength of 0% as most are not located near enough to PRx coil 2004 to yield a ping response. In this example, four coils 2006a, 2006b, 2006c, and 2006d are in close enough proximity to receive a ping response from PRx coil 2004 when pinging. As further illustrated in this example 2000, each coil has a relative strength value or percentage that indicates the strength of the ping response from PRx 2004 when the coil sends a ping. As merely exemplary numbers for the sake of illustration, coil 2006a has a relative strength of 40%, coil 2006b has a relative strength of 20%, coil 2006c has a relative strength of 40%, and coil 2006d has a relative strength of 5%, In an example, it is noted that the initial ping determinations for each coil 2006 may be performed using analog/passive pinging in order to implement this process more quickly. Additionally, it is noted that the analog pinging process may also not necessarily measure relative strength, but merely to identify those coils of wireless charging surface 2002 having a ping response.

Once all of the coils 2006 having a ping response (or a ping strength response above a predetermined threshold in other examples) have been identified, a digital ping of those identified coils may then be performed, again one at time, although not necessarily limited to such. In this example, the digital ping may be limited to only those coils identified as having a ping response from an analog/passive ping scan of all of the coils in charging surface 2002. The relative strengths may be determined from the digital ping (or the previously determined relative strengths from the analog scan may be refined to increase the accuracy).

Based on the measured or determined relative strengths, a location of the PRx 2004 may be determined through calculation using geometric or other mathematical techniques (e.g., triangulation) to determine location of the PRx 2004. As an example, FIG. 20 illustrates a visual illustration 2010 of a triangulation that may be performed. In this illustration, the relative strengths and locations of coils 2006a, 2006b, and 2006c may be used to make the triangulation calculations. Additionally, the relative strengths may be accounted for as illustrated by the relative sizes for the contributions of coils 2006a, 2006b, and 2006c as shown at 2012a, 2012b, and 2012c. Based on the calculation, an optimal coil or group/combination of coils may be selected by wireless charging device.

Figure 21:
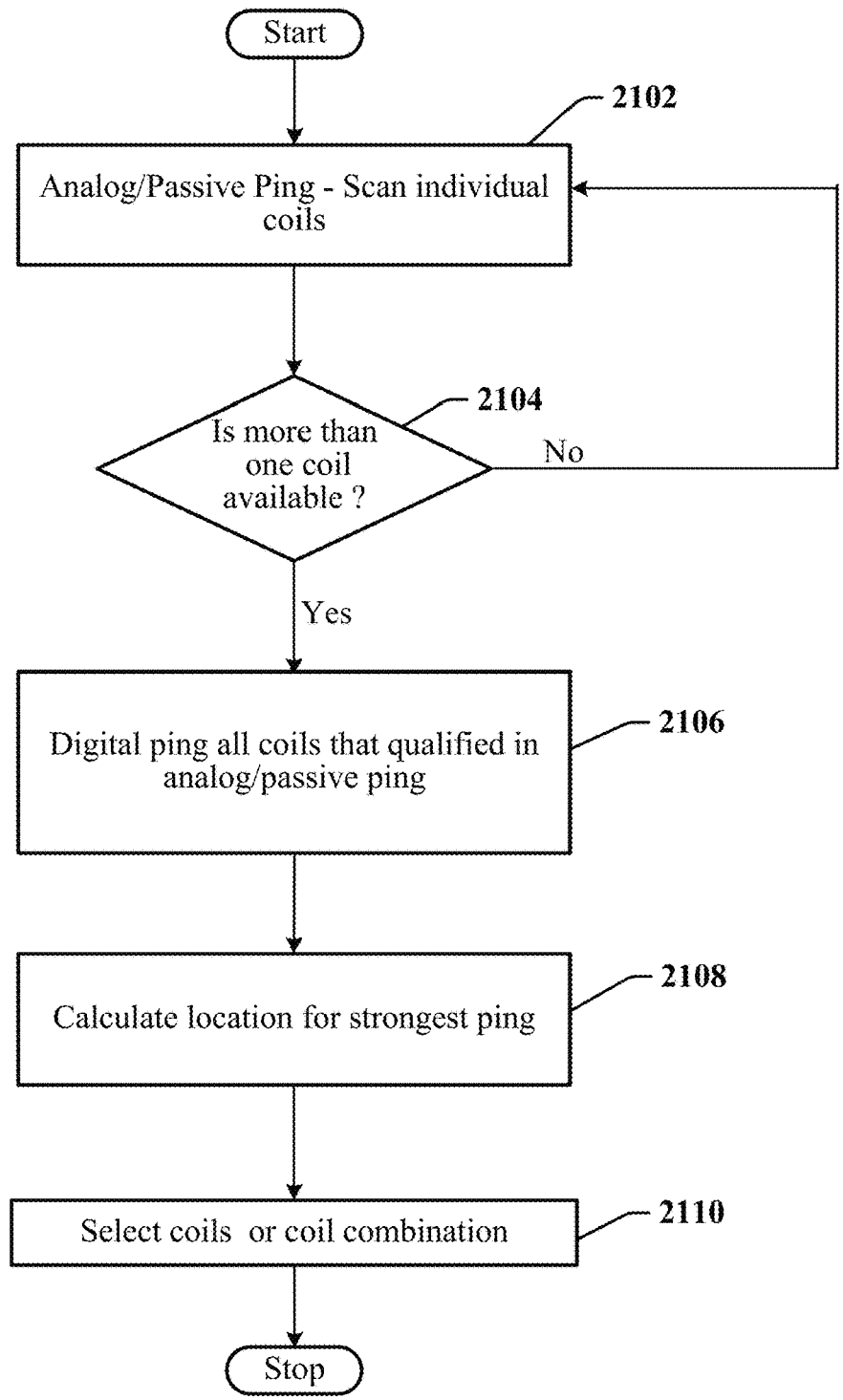
FIG. 21 illustrates a flow chart of another method for coil selection using pinging in wireless charging device.

FIG. 21 illustrates a flow chart 2100 illustrating the methodology discussed above in for wireless changing in connection with the example disclosed in FIG. 20. In block 2102, a scanning ping of all coils is performed on an individual basis (i.e., one at a time), as was discussed above in connection with FIG. 20. In certain aspects, the scan in block 2102 may be performed using analog or passive ping techniques. In other examples, the scan in block 2102 may include measuring or determining the relative strength for the coils that yield a ping response from a receiver device (PRx) in proximity to the wireless charging device.

After performing the scan in block 2102, flow proceeds to decision block 2104 to determine if the device has more than one coil available based on scan results of block 2102. If not, a need for coil selection is nonexistent and flow proceeds back to block 2012. On the other if two or more coils were determined as yield a response to the pings, flow proceeds to block 2106. In this block, a digital ping by those coils identified at block 2102 may be performed. In an aspect, the process 2106 may again be performed one coil at a time. Furthermore, block 2106 may include determining the relative strength, such as with a value or percentage as illustrated in FIG. 20. The result of block 2106 will then yield two or more relative strengths of the identified coils based on digital ping. From this information a location of the PRx device (e.g., 2004) may be calculated as shown in block 2108. In particular, the calculation may use a trigonometric triangulation calculation as one example, and further the relative strengths may be accounted for in the calculation such as through a weighting of relative strengths. The method 2100 may then include selection of one or more coils (e.g., a coil combination) for supplying charging energy to the PRx device as shown at block 2110.

Example of a Processing Circuit

Figure 22:
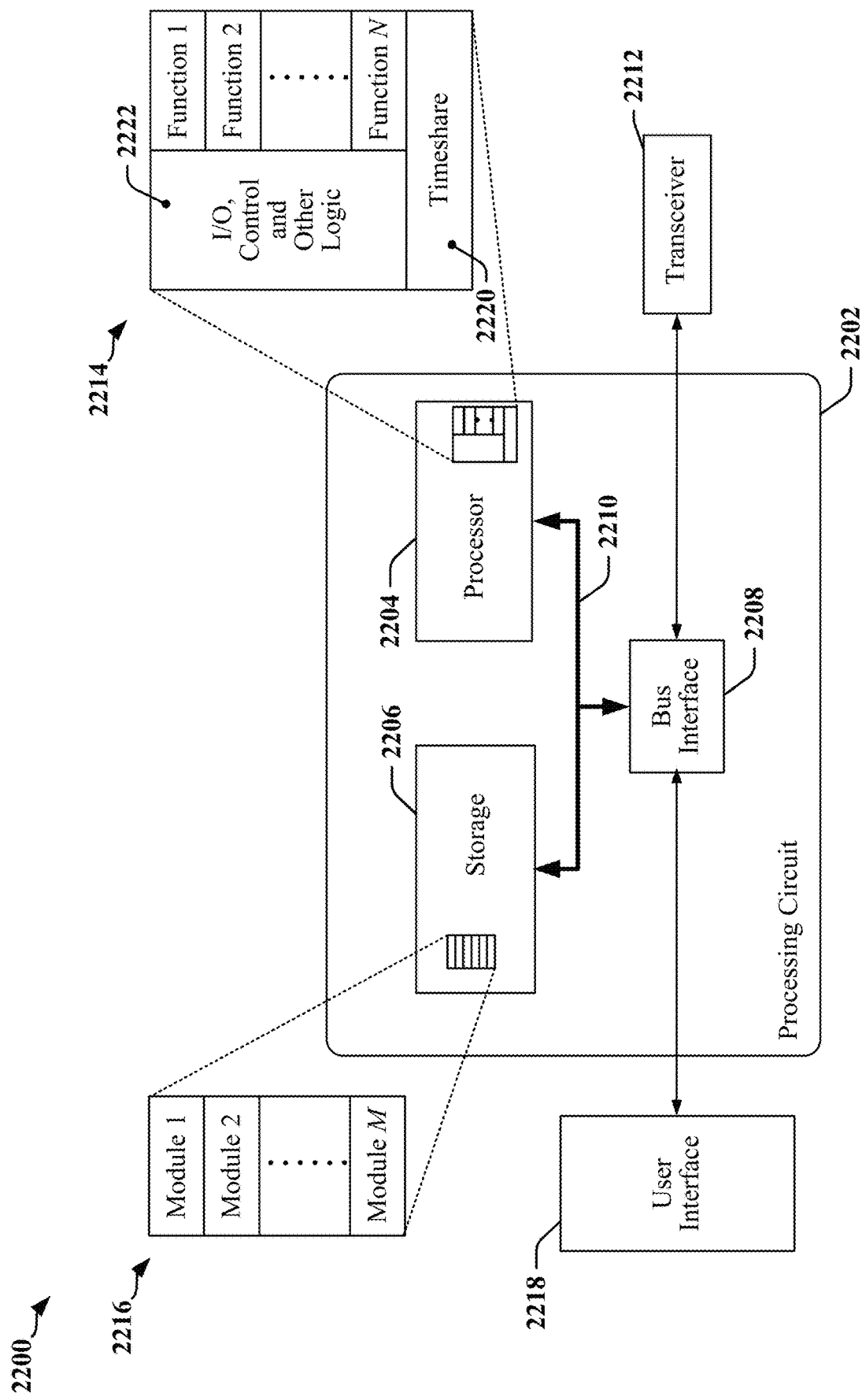
FIG. 22 illustrates one example of an apparatus employing a processing circuit that may be adapted according to certain aspects disclosed herein.

FIG. 22 illustrates an example of a hardware implementation for an apparatus 2200 that may be incorporated in a charging device that enables a battery to be wirelessly charged. In some examples, the apparatus 2200 may perform one or more functions disclosed herein. In accordance with various aspects of the disclosure, an element, or any portion of an element, or any combination of elements as disclosed herein may be implemented using a processing circuit 2202. The processing circuit 2202 may include one or more processors 2204 that are controlled by some combination of hardware and software modules. Examples of processors 2204 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 2204 may include specialized processors that perform specific functions, and that may be configured, augmented or controlled by one of the software modules 2216. The one or more processors 2204 may be configured through a combination of software modules 2216 loaded during initialization, and further configured by loading or unloading one or more software modules 2216 during operation.

In the illustrated example, the processing circuit 2202 may be implemented with a bus architecture, represented generally by the bus 2210. The bus 2210 may include any number of interconnecting buses and bridges depending on the specific application of the processing circuit 2202 and the overall design constraints. The bus 2210 links together various circuits including the one or more processors 2204, and storage 2206. Storage 2206 may include memory devices and mass storage devices, and may be referred to herein as computer-readable media and/or processor-readable media. The storage 2206 may include transitory storage media and/or non-transitory storage media.

The bus 2210 may also link various other circuits such as timing sources, timers, peripherals, voltage regulators, and power management circuits. A bus interface 2208 may provide an interface between the bus 2210 and one or more transceivers 2212. In one example, a transceiver 2212 may be provided to enable the apparatus 2200 to communicate with a charging or receiving device in accordance with a standards-defined protocol. Depending upon the nature of the apparatus 2200, a user interface 2218 (e.g., keypad, display, speaker, microphone, joystick) may also be provided, and may be communicatively coupled to the bus 2210 directly or through the bus interface 2208.

A processor 2204 may be responsible for managing the bus 2210 and for general processing that may include the execution of software stored in a computer-readable medium that may include the storage 2206. In this respect, the processing circuit 2202, including the processor 2204, may be used to implement any of the methods, functions and techniques disclosed herein. The storage 2206 may be used for storing data that is manipulated by the processor 2204 when executing software, and the software may be configured to implement any one of the methods disclosed herein.

One or more processors 2204 in the processing circuit 2202 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 2206 or in an external computer-readable medium. The external computer-readable medium and/or storage 2206 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 2206 may also include, by way of example, a carrier wave, a transmission line, and any other suitable medium for transmitting software and/or instructions that may be accessed and read by a computer. Computer-readable medium and/or the storage 2206 may reside in the processing circuit 2202, in the processor 2204, external to the processing circuit 2202, or be distributed across multiple entities including the processing circuit 2202. The computer-readable medium and/or storage 2206 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 2206 may maintain and/or organize software in loadable code segments, modules, applications, programs, etc., which may be referred to herein as software modules 2216. Each of the software modules 2216 may include instructions and data that, when installed or loaded on the processing circuit 2202 and executed by the one or more processors 2204, contribute to a run-time image 2214 that controls the operation of the one or more processors 2204. When executed, certain instructions may cause the processing circuit 2202 to perform functions in accordance with certain methods, algorithms and processes described herein.

Some of the software modules 2216 may be loaded during initialization of the processing circuit 2202, and these software modules 2216 may configure the processing circuit 2202 to enable performance of the various functions disclosed herein. For example, some software modules 2216 may configure internal devices and/or logic circuits 2222 of the processor 2204, and may manage access to external devices such as a transceiver 2212, the bus interface 2208, the user interface 2218, timers, mathematical coprocessors, and so on. The software modules 2216 may include a control program and/or an operating system that interacts with interrupt handlers and device drivers, and that controls access to various resources provided by the processing circuit 2202. The resources may include memory, processing time, access to a transceiver 2212, the user interface 2218, and so on.

One or more processors 2204 of the processing circuit 2202 may be multifunctional, whereby some of the software modules 2216 are loaded and configured to perform different functions or different instances of the same function. The one or more processors 2204 may additionally be adapted to manage background tasks initiated in response to inputs from the user interface 2218, the transceiver 2212, and device drivers, for example. To support the performance of multiple functions, the one or more processors 2204 may be configured to provide a multitasking environment, whereby each of a plurality of functions is implemented as a set of tasks serviced by the one or more processors 2204 as needed or desired. In one example, the multitasking environment may be implemented using a timesharing program 2220 that passes control of a processor 2204 between different tasks, whereby each task returns control of the one or more processors 2204 to the timesharing program 2220 upon completion of any outstanding operations and/or in response to an input such as an interrupt. When a task has control of the one or more processors 2204, the processing circuit is effectively specialized for the purposes addressed by the function associated with the controlling task. The timesharing program 2220 may include an operating system, a main loop that transfers control on a round-robin basis, a function that allocates control of the one or more processors 2204 in accordance with a prioritization of the functions, and/or an interrupt driven main loop that responds to external events by providing control of the one or more processors 2204 to a handling function.

In one implementation, the apparatus 2200 includes or operates as a wireless charging device that has a battery charging power source coupled to a charging circuit, a plurality of charging cells and a controller, which may be included in or implemented with one or more processors 2204. The plurality of charging cells may be configured to provide a charging surface. At least one coil may be configured to direct an electromagnetic field through a charge transfer area of each charging cell. The controller may be configured to cause the charging circuit to provide a charging current to a resonant circuit when a receiving device is placed on the charging surface, detect a change or rate of change in voltage or current level associated with the resonant circuit or a change or rate of change in power transferred to the receiving device, and determine that the receiving device has been removed from the charging surface when the change or rate of the change in voltage or current level or change or rate of change in power transferred to the receiving device exceeds a threshold value.

In some implementations, the resonant circuit includes a transmitting coil. The controller may be further configured to determine that the receiving device has been removed from the charging surface when a voltage measured at a terminal of the transmitting coil exceeds a threshold voltage level. In one example, the threshold voltage level is maintained by a lookup table and determined when the transmitting coil is electromagnetically uncoupled. In another example, the threshold voltage level is determined when the receiving device is first placed on the charging surface.

In certain implementations, the controller is further configured to cause a transmitting coil to issue a ping that may be received by a power receiving device (e.g., PRx) in proximity to wireless charging device (e.g., disposed on the wireless charging surface). Additionally, the transmitting coil may be configured to receive a ping reply such as an ASK modulated reply from the power receiving device (PRx). Additionally, the measured in the resonant circuit has a magnitude that is less than a threshold current level. In one example, the threshold current level is maintained by a lookup table and determined when no object is electromagnetically coupled with a coil in the resonant circuit. In another example the threshold current level is determined when the receiving device is first placed on the charging surface.

In some implementations, the apparatus 2200 has one or more sensors located proximate to an exterior surface of the charging device. The controller may be further configured to receive measurements from the one or more sensors, and measure the voltage or current level associated with the resonant circuit when one of the measurements indicates physical removal of the receiving device. The sensors may include a strain measuring sensor, an accelerometer, an infrared or ultrasonic sensing element and/or a hall-effect device.

In some implementations, the storage 2206 maintains instructions and information where the instructions are configured to cause the one or more processors 2204 to. send one or more pings from a plurality of charging coils (or charging cells having at least one charging coil) in the wireless charging device using an analog ping process to scan for one or more ping responses from a receiving device in proximity to the wireless charging device. In particular, this function of sending of pings may be include the processes in blocks 1902 or 2102 in FIGS. 19 and 21, for either scanning using individual coils or groups/combinations of coils.

Additionally, the storage 2206 maintains instructions and information where the instructions are configured to cause the one or more processor 2204 to determine a subset of charging coils of the plurality of charging coils in the wireless device that received ping responses from the receiving device in response to the sending of pings with the analog process. As an example, this function may include the processes in blocks 1904 or 2104, wherein the ping responses from analog or passive pinging is used by the processor 2204 determine potential coils to be subsequently used for digital pinging of the identified potential coils (i.e., the subset of charging of coils).

In further implementations, the storage 2206 maintains instructions and information where the instructions are configured to cause the one or more processor 2204 to send one or more pings from an identified subset of charging coils (i.e., coils or combinations of coils receiving ping responses from the receiving device) using a digital ping process. As an example, this function may include the processes in blocks 1906 or 2106 wherein the qualified coil groups/combinations or individual coils are pinged using a digital or active ping process as was discussed in connection with FIGS. 18-21. Additionally, the storage 2206 maintains instructions and information where the instructions are configured to cause the one or more processor 2204 to select a combination of one or more charging coils of the subset of charging coils based on ping responses from the receiving device in response to the digital ping process. Examples of this function may include the processes of blocks 1908 or 2108.

Figure 23:
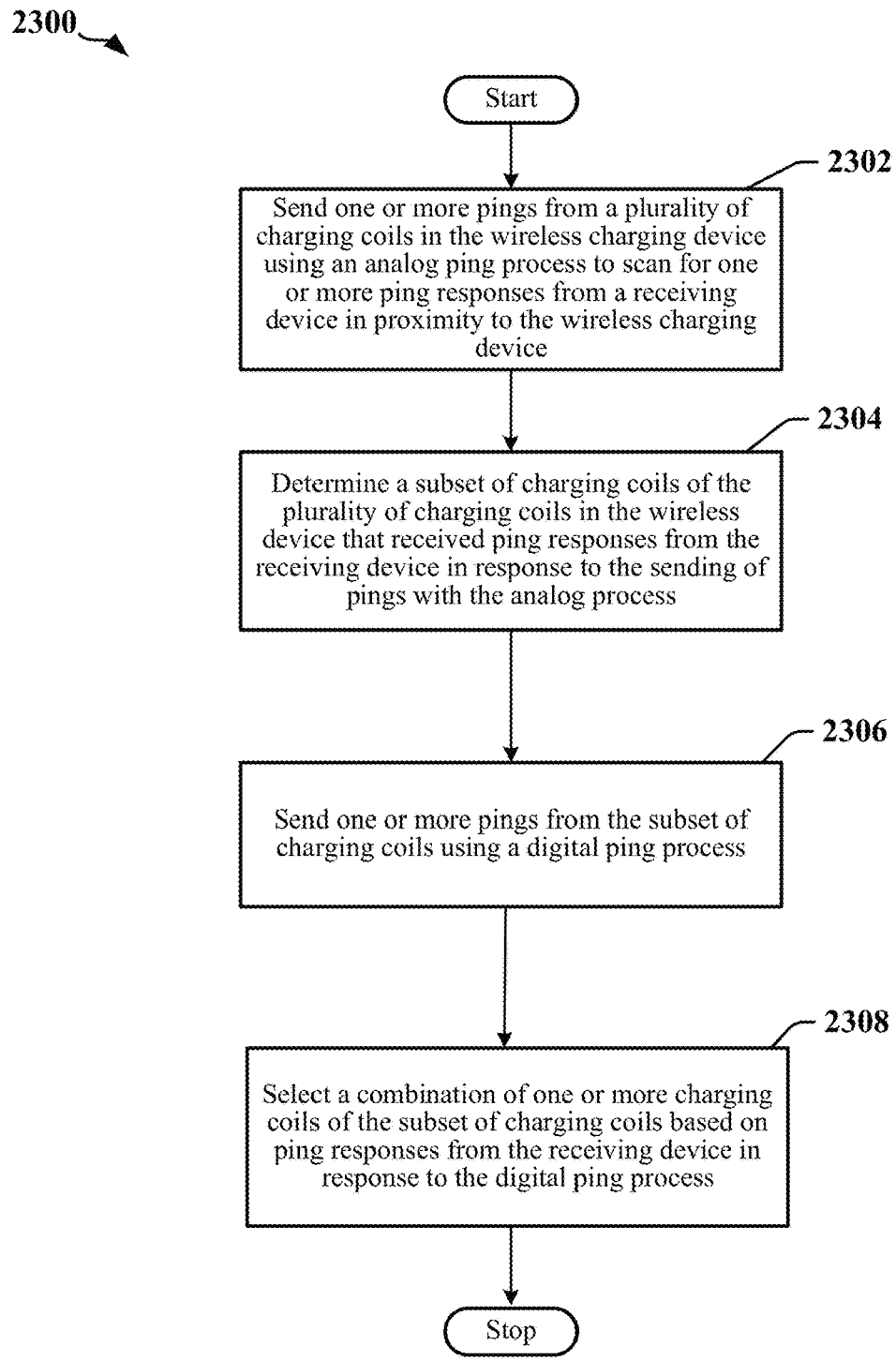
FIG. 23 illustrates a method for operating a charging device in accordance with certain aspects of this disclosure.

FIG. 23 is a flowchart illustrating a method 2300 for operating a charging device in accordance with certain aspects of this disclosure. The method 2300 may be performed by a controller in the charging device. At block 2302, the controller may send one or more pings from a plurality of charging coils in the wireless charging device using an analog ping process to scan for one or more ping responses from a receiving device in proximity to the wireless charging device.

Additionally, method 2300 includes determining a subset of charging coils of the plurality of charging coils in the wireless device that received ping responses from the receiving device in response to the sending of pings with the analog process as shown in block 2304. The processes of block 2304 may include determining the subset from either scanning coil combinations as was discussed in the example of FIGS. 18 and 19 or individual coils as was discussed in the example of FIGS. 20 and 21.

Further, method 2300 may include sending pings from the subset of charging coils using a digital ping process as shown at block 2306. This process in block 2306 may include sending digital or active pings using combinations as in the example of FIGS. 18 and 19 or using individual coils as was discussed in the example of FIGS. 20 and 21.

Moreover, method 2300 includes selecting a combination of one or more charging coils of the subset of charging coils based on ping responses from the receiving device in response to the digital ping process as shown at block 2308. It is noted here that the selections of one or more coils may be achieved through the scanning of combinations as in the example of FIGS. 18 and 19 or using digital pings from individuals coils and then mathematically calculating which coils could be combined as was discussed in the example of FIGS. 20 and 21. Thus, in one example method 2300 provides for selection of an optimized combination of coils to provide charging for a receiving device by either pinging from selected variations of a combination of coils and deciding which is optimal from the observed ping responses, or from individual coil ping strengths and then mathematically determining the optimal coil combination from the individual ping strengths.

Some implementation examples are described in the following numbered clauses:

1. A method for operating a wireless charging device, comprising: sending one or more pings from a plurality of charging coils in the wireless charging device using an analog ping process to scan for one or more ping responses from a receiving device in proximity to the wireless charging device; determining a subset of charging coils of the plurality of charging coils in the wireless charging device that received ping responses from the receiving device in response to the sending of the one or more pings with the analog ping process; sending one or more pings from the subset of charging coils using a digital ping process; and selecting a combination of one or more charging coils of the subset of charging coils based on ping responses from the receiving device in response to the digital ping process.

2. The method as described in clause 1, wherein sending pings from the subset of charging coils using the digital ping process further comprises: sending one or more pings to the receiving device from a plurality of different coil combinations of groups of charging coils within the subset of charging coils.

3. The method as described in clause 2, further comprising: determining a strength value of a ping response for each of the plurality of different charging coil combinations of groups of charging coils within the subset of charging coils; and selecting a coil combination of the plurality of different charging coil combinations having a highest strength value for use in supplying charging energy to the receiving device.

4. The method as described in any of clauses 1-3, wherein sending pings from subset of charging coils using the digital ping process further comprises: sending one or more pings to the receiving device from each charging coil in the subset of charging coils.
5. The method as described in clause 4, further comprising: determining a relative strength value of a ping response for each coil in the subset of charging coils; calculating a location for a strongest ping based on the determined relative strength values for each of the ping responses; and selecting the combination of one or more charging coils of the subset of charging coils based on the calculated location for use in supplying charging energy to the receiving device.
6. The method as described in clause 5, wherein calculating the location of the strongest ping comprises a trigonometric calculation based on the known locations of two or more of the charging coils in the subset of charging coils.
7. A wireless charging apparatus, comprising: a battery charging power source coupled to a charging circuit; a plurality of charging cells configured to provide a charging surface, wherein at least one coil is configured to direct an electromagnetic field through a charge transfer area of each charging cell; and a controller configured to: send one or more pings from the plurality of charging cells using an analog ping process to scan for one or more ping responses from a receiving device in proximity to the wireless charging device; determine a subset of charging cells of the plurality of charging cells in the wireless charging device that received ping responses from the receiving device in response to the sending of the one or more pings with the analog ping process; send pings from the subset of charging cells using a digital ping process; and select a combination of one or more charging cells of the subset of charging cells based on ping responses from the receiving device in response to the digital ping process.
8. The wireless charging apparatus as described in clause 7, wherein the controller is configured to: send one or more pings to the receiving device from a plurality of different charging cell combinations of groups of charging cells within the subset of charging cells.
9. The wireless charging apparatus as described in clause 8, wherein the controller is configured to: determine a strength value of a ping response for each of the plurality of different charging cell combinations; and select a charging cell combination of the plurality of different charging cell combinations having a highest strength value for use in supplying charging energy to the receiving device.
10. The wireless charging apparatus as described in clause 9, wherein the controller is configured to: send one or more pings to the receiving device from each charging cell in the subset of charging cells.
11. The wireless charging apparatus as described in any of clauses 7-10, wherein the controller is configured to: determine a relative strength value of a ping response for each charging cell in the subset of charging cells; calculate a location for a strongest ping based on the determined relative strength values for each of the ping responses; and select the combination of one or more charging cells of the subset of charging cells based on the calculated location for use in supplying charging energy to the receiving device.
12. The wireless charging apparatus as described in clause 11, wherein calculating the location of the strongest ping comprises a trigonometric calculation based on the known locations of two or more of the charging cells in the subset of charging cells.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:
1. A method for operating a wireless charging device, comprising:
   sending pings from a plurality of charging coils deployed across a charging surface of the wireless charging device using an analog ping process to scan for one or more ping responses from a receiving device in proximity to the wireless charging device; and
   when at least two different charging coils receive ping responses:
      determining a subset of charging coils of the plurality of charging coils in the wireless charging device that received ping responses from the receiving device in response to the sending of the pings with the analog ping process;
      sending one or more pings to the receiving device from each charging coil in the subset of charging coils using a digital ping process;
         determining a relative strength value of a ping response for each coil in the subset of charging coils; calculating a location for a strongest ping based on the determined relative strength values for each of the ping responses; and
         selecting a combination of one or more charging coils of the subset of charging coils for use in supplying charging energy to the receiving device based on the calculated location.
2. The method of claim 1, wherein sending pings from the subset of charging coils using the digital ping process further comprises:
   sending one or more pings to the receiving device from a plurality of different coil combinations of groups of charging coils within the subset of charging coils.
3. The method of claim 2, further comprising:
   determining a strength value of a ping response for each of the plurality of different charging coil combinations of groups of charging coils within the subset of charging coils; and selecting a coil combination of the plurality of different charging coil combinations having a highest strength value for use in supplying charging energy to the receiving device.

4. The method of claim 1, wherein calculating the location of the strongest ping comprises a trigonometric calculation based on the known locations of two or more of the charging coils in the subset of charging coils.

5. A wireless charging apparatus, comprising:
 a battery charging power source coupled to a charging circuit;
 a plurality of charging cells configured to provide a charging surface, wherein at least one coil is configured to direct an electromagnetic field through a charge transfer area of each charging cell and wherein the charging cells are deployed across the charging surface; and
 a controller configured to:
 send pings from the plurality of charging cells using an analog ping process to scan for one or more ping responses from a receiving device in proximity to the wireless charging device; and
 when at least two different charging coils receive ping responses:
  determine a subset of charging cells of the plurality of charging cells in the wireless charging device that received ping responses from the receiving device in response to the sending of the pings with the analog ping process;
  send pings to the receiving device from each charging coil in the subset of charging cells using a digital ping process;
  calculating a location for a strongest ping based on the determined relative strength values for each of the ping responses; and
  select a combination of one or more charging coils of the subset of charging coils for use in supplying charging energy to the receiving device based on the calculated location.

6. The wireless charging apparatus of claim 5, wherein the controller is configured to:
 send one or more pings to the receiving device from a plurality of different charging cell combinations of groups of charging cells within the subset of charging cells.

7. The wireless charging apparatus of claim 6, wherein the controller is configured to:
 determine a strength value of a ping response for each of the plurality of different charging cell combinations; and
 select a charging cell combination of the plurality of different charging cell combinations having a highest strength value for use in supplying charging energy to the receiving device.

8. The wireless charging apparatus of claim 5, wherein calculating the location of the strongest ping comprises a trigonometric calculation based on the known locations of two or more of the charging cells in the subset of charging cells.

* * * * *